United States Patent
Asada et al.

(10) Patent No.: US 9,339,933 B2
(45) Date of Patent: May 17, 2016

(54) ROBOT, ROBOT CONTROL DEVICE, AND ROBOT SYSTEM

(71) Applicant: Seiko Epson Corporation, Tokyo (JP)

(72) Inventors: Atsushi Asada, Matsumoto (JP); Shunsuke Toshimitsu, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/195,913

(22) Filed: Mar. 4, 2014

(65) Prior Publication Data

US 2014/0309776 A1    Oct. 16, 2014

(30) Foreign Application Priority Data

Apr. 10, 2013  (JP) ................. 2013-082273

(51) Int. Cl.
| | |
|---|---|
| G05B 15/00 | (2006.01) |
| G05B 19/00 | (2006.01) |
| B25J 13/08 | (2006.01) |
| B25J 9/06 | (2006.01) |
| B25J 17/00 | (2006.01) |
| B25J 19/02 | (2006.01) |
| B25J 9/16 | (2006.01) |

(52) U.S. Cl.
CPC .. *B25J 13/08* (2013.01); *B25J 9/06* (2013.01); *B25J 9/1651* (2013.01); *B25J 13/088* (2013.01); *B25J 17/00* (2013.01); *B25J 19/02* (2013.01); *Y10T 74/20311* (2015.01); *Y10T 74/20329* (2015.01)

(58) Field of Classification Search
CPC .............. B25J 17/00; B25J 19/02; B25J 9/06; B25J 9/1694; B25J 13/088; G05B 2219/37388; G05B 2219/40547; G01B 21/22
USPC ......................... 700/245, 258; 901/14, 27, 30
See application file for complete search history.

(56) References Cited

U.S. PATENT DOCUMENTS

| | | | |
|---|---|---|---|
| 4,937,759 | A | 6/1990 | Vold |
| 5,550,953 | A | 8/1996 | Seraji |
| 5,710,870 | A | 1/1998 | Ohm et al. |

(Continued)

FOREIGN PATENT DOCUMENTS

| | | |
|---|---|---|
| CN | 102501242 A | 6/2012 |
| EP | 2703130 A2 | 3/2014 |

(Continued)

OTHER PUBLICATIONS

A3G4250D MEMS motion sensor:3-axis digital output gyroscope Feb. 2012, ST Microelectronics, Doc 022768 Rev3, pp. 1-45.

(Continued)

*Primary Examiner* — Khoi Tran
*Assistant Examiner* — Jorge Peche
(74) *Attorney, Agent, or Firm* — Harness, Dickey & Pierce, P.L.C.

(57) ABSTRACT

A robot includes a base, a first arm rotatably connected to the base around a first rotating axis, a second arm rotatably connected to the first arm around a second rotating axis orthogonal to the first rotating axis, a third arm rotatably connected to the second arm around a third rotating axis parallel to the second rotating axis, and a three-axis inertial sensor provided in the third arm and including a first detection axis, a second detection axis, and a third detection axis orthogonal to each other, the first detection axis and the third rotating axis being parallel to each other.

9 Claims, 14 Drawing Sheets

(56) References Cited

U.S. PATENT DOCUMENTS

| | | | |
|---|---|---|---|
| 5,781,705 A | 7/1998 | Endo | |
| 5,944,476 A * | 8/1999 | Bacchi | B25J 9/042 414/744.3 |
| 6,216,056 B1 * | 4/2001 | Ito | B25J 9/16 700/157 |
| 6,343,242 B1 * | 1/2002 | Nomura | B25J 9/1676 318/568.11 |
| 6,418,629 B1 * | 7/2002 | Oh | G01B 21/22 33/1 PT |
| 6,922,034 B2 | 7/2005 | Hirose | |
| 7,202,442 B2 | 4/2007 | Nakagiri et al. | |
| 7,233,872 B2 * | 6/2007 | Shibasaki | A61B 5/11 33/512 |
| 7,756,606 B2 | 7/2010 | Nakajima et al. | |
| 7,765,023 B2 * | 7/2010 | Oaki | B25J 9/1692 700/157 |
| 8,631,720 B2 | 1/2014 | Nakagiri et al. | |
| 2003/0020461 A1 * | 1/2003 | Nomura | B62D 15/02 324/200 |
| 2003/0178964 A1 * | 9/2003 | Challoner | B25J 9/1694 318/568.21 |
| 2005/0113973 A1 | 5/2005 | Endo et al. | |
| 2005/0166413 A1 * | 8/2005 | Crampton | B25J 13/088 33/503 |
| 2005/0240307 A1 | 10/2005 | Kuroki et al. | |
| 2005/0246061 A1 | 11/2005 | Oaki et al. | |
| 2007/0288124 A1 * | 12/2007 | Nagata | B25J 9/1694 700/258 |
| 2008/0246428 A1 * | 10/2008 | Shimada | B25J 9/06 318/568.11 |
| 2009/0149993 A1 * | 6/2009 | Neki | B62D 57/032 700/254 |
| 2010/0113980 A1 * | 5/2010 | Herr | A61F 2/60 600/587 |
| 2010/0256812 A1 * | 10/2010 | Tsusaka | A47L 9/24 700/254 |
| 2010/0286823 A1 * | 11/2010 | Neki | B25J 19/005 700/245 |
| 2010/0318223 A1 | 12/2010 | Motoyoshi et al. | |
| 2011/0004343 A1 * | 1/2011 | Iida | B25J 9/1638 700/253 |
| 2011/0082566 A1 * | 4/2011 | Herr | A61F 2/60 623/24 |
| 2011/0107866 A1 * | 5/2011 | Oka | B25J 9/0084 74/490.03 |
| 2011/0257785 A1 * | 10/2011 | Nihei | B25J 9/1674 700/254 |
| 2012/0010748 A1 * | 1/2012 | Sasai | B25J 9/1674 700/254 |
| 2012/0126664 A1 | 5/2012 | Ogura et al. | |
| 2012/0215356 A1 * | 8/2012 | Igarashi | B25J 9/1641 700/258 |
| 2012/0215357 A1 * | 8/2012 | Igarashi | B25J 9/1641 700/258 |
| 2012/0272774 A1 * | 11/2012 | Kirihara | B25J 9/0027 74/490.06 |
| 2012/0296471 A1 | 11/2012 | Inaba et al. | |
| 2013/0073086 A1 * | 3/2013 | Motoyoshi | G05B 15/00 700/258 |
| 2013/0079929 A1 | 3/2013 | Lim et al. | |
| 2014/0135611 A1 * | 5/2014 | Loustaudaudine | B25J 9/045 600/407 |
| 2014/0230581 A1 * | 8/2014 | Nakatani | B25J 13/085 73/865 |

FOREIGN PATENT DOCUMENTS

| | | |
|---|---|---|
| EP | 2703131 A2 | 3/2014 |
| JP | 2011-136395 A | 7/2011 |
| JP | 2011136395 A * | 7/2011 |
| WO | WO-2010-019310 A1 | 2/2010 |

OTHER PUBLICATIONS

Analog Devices, "ADIS16120," 2007, Rev. B, pp. 1-12.
Wilcoxon Research "Vibration sensor wiring and cabling," Aug. 2008, pp. 1-12.
Extended European Search Report for Application No. EP 14162332.2 dated Feb. 4, 2016 (9 pages).
Extended European Search Report for Application No. EP 13182172.0 dated Feb. 11, 2016 (7 pages).

* cited by examiner

ROBOT, ROBOT CONTROL DEVICE, AND ROBOT SYSTEM

BACKGROUND

1. Technical Field

The present invention relates to a robot, a robot control device, and a robot system.

2. Related Art

In a robot described in JP-A-2011-136395, a six-axis sensor which detects accelerations in the directions of an X axis, a Y axis, and a Z axis orthogonal to each other and accelerations around the X axis, the Y axis, and the Z axis is provided in a front end portion, that is, a sixth link on a front-most end side. A vibrational component of angular velocity around an intended axis is obtained for each link on the basis of the detection result of the six-axis sensor. As such, control for suppressing vibration is performed. The vibrational component of the angular velocity of the link is called "torsional angular velocity", "vibrational angular velocity", or the like.

In the robot described in JP-A-2011-136395, since the posture of the six-axis sensor changes with the motion of the robot, it is necessary to perform coordinate axis transformation or the like, called Jacobi's transformation, from the detection result of the six-axis sensor, and to obtain the vibrational component of the angular velocity of each link. Moreover, it is necessary to perform computation in conformity with the rotation angle of a motor which changes every moment.

Since complicated and enormous computation processing is required, there is a problem in that a control device which has a high-performance and an expensive CPU (Central Processing Unit) or the like is required. This causes an increase in cost.

Also, since the complicated and enormous computation processing is required, there is a problem in that a computation error is likely to occur. If such an error occurs, it is not possible to sufficiently suppress vibration due to the computation error.

SUMMARY

An advantage of some aspects of the invention is that it provides a robot, a robot control device, and a robot system capable of suppressing vibration easily and reliably.

A robot according to an aspect of the invention includes a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, a third arm which is connected to the second arm rotatably around a third rotating axis, which is an axis parallel to the second rotating axis, as a rotation center, and a three-axis inertial sensor which includes a first detection axis, a second detection axis, and a third detection axis orthogonal to each other, and is provided in the third arm, the first detection axis being parallel to the third rotating axis.

With this configuration, it is possible to suppress vibration easily and reliably.

That is, the inertia of the third arm including the rotation amount of the first arm and the second arm can be detected by the three-axis inertial sensor. Then, it is possible to suppress vibration on the basis of these detection results. For this reason, it is possible to suppress vibration more reliably. It is also possible to reduce the number of inertial sensors, to reduce cost, and to simplify the configuration compared to a case where an inertial sensor is provided in each of the first arm and the second arm.

Even if the posture of the robot changes, for example, even if the first arm rotates and the second arm rotates, the first detection axis of the inertial sensor is constant. For this reason, it is not necessary to correct the angular velocity around the first detection axis of the third arm detected by the inertial sensor by the direction of the inertial sensor. Accordingly, complicated and enormous computation is not required. Therefore, a computation error is less likely to occur, and it is possible to reliably suppress vibration and to increase a response speed in the control of the robot.

In the robot according to the aspect of the invention, it is preferable that the three-axis inertial sensor is a three-axis angular velocity sensor which detects an angular velocity around the first detection axis, an angular velocity around the second detection axis, and an angular velocity around the third detection axis.

With this configuration, since the composite angular velocity of the first arm and the second arm and the third arm can be detected, it is possible to suppress vibration more easily and reliably.

In the robot according to the aspect of the invention, it is preferable that the robot further includes an inertial sensor unit having a housing, and the three-axis inertial sensor and a circuit unit which are provided in the housing, the circuit unit AD converting and transmitting a signal output from the three-axis inertial sensor, in which the inertial sensor unit is provided in the third arm.

With this configuration, it is possible to simplify the configuration compared to a case where the circuit unit is provided separately.

In the robot according to the aspect of the invention, it is preferable that the appearance of the housing is a rectangular parallelepiped, and the first detection axis of the three-axis inertial sensor matches the normal to the largest surface of the rectangular parallelepiped of the housing.

With this configuration, it is possible to allow the direction of the first detection axis of the three-axis inertial sensor to be recognized easily and reliably, and to allow the three-axis inertial sensor to take an appropriate posture easily.

In the robot according to the aspect of the invention, it is preferable that the second detection axis of the three-axis inertial sensor matches the normal to a set (pair) of opposite surfaces among four surfaces connected to the largest surface of the rectangular parallelepiped of the housing, and the third detection axis of the three-axis inertial sensor matches the normal to the other set (pair) of opposite surfaces among four surfaces connected to the largest surface of the rectangular parallelepiped of the housing.

With this configuration, it is possible to allow the directions of the second and third detection axes of the three-axis inertial sensor to be recognized easily and reliably, and to allow the three-axis inertial sensor to take an appropriate posture easily.

In the robot according to the aspect of the invention, it is preferable that the housing has an attachment portion to be attached to the third arm in a corner portion of the housing.

With this configuration, it is possible to attach the inertial sensor unit to the third arm reliably.

In the robot according to the aspect of the invention, it is preferable that the robot further includes a fixing member which is conductive and fixes the attachment portion of the housing to the third arm, the circuit unit of the inertial sensor unit being grounded to the third arm by the fixing member.

With this configuration, it is possible to reduce the number of components and to simplify the configuration.

In the robot according to the aspect of the invention, it is preferable that the third arm has a housing and an arm-side attachment portion formed integrally with the housing, and the inertial sensor unit is attached directly to the arm-side attachment portion.

With this configuration, the inertial sensor unit can reliably rotate integrally with the third arm.

In the robot according to the aspect of the invention, it is preferable that the robot further includes a cable which is provided in the third arm and supplies power to the robot, in which the three-axis inertial sensor is arranged in an end portion of the third arm on an opposite side to the cable.

With this configuration, it is possible to prevent the three-axis inertial sensor from being affected by noise from the cable, and to prevent a circuit or a wiring on the three-axis inertial sensor side from being short-circuited by the cable.

In the robot according to the aspect of the invention, it is preferable that the robot further includes a fourth arm which is connected to the third arm rotatably around a fourth rotating axis, which is an axis orthogonal to the third rotating axis or an axis parallel to the axis orthogonal to the third rotating axis, as a rotation center, a fifth arm which is connected to the fourth arm rotatably around a fifth rotating axis, which is an axis orthogonal to the fourth rotating axis or an axis parallel to the axis orthogonal to the fourth rotating axis, as a rotation center, and a sixth arm which is connected to the fifth arm rotatably around a sixth rotating axis, which is an axis orthogonal to the fifth rotating axis or an axis parallel to the axis orthogonal to the fifth rotating axis, as a rotation center.

With this configuration, a more complicated motion can be easily performed.

In the robot according to the aspect of the invention, it is preferable that the first rotating axis matches (is aligned with) the normal to an installation surface of the base.

With this configuration, it is possible to easily control the robot.

Another aspect of the invention is directed to a robot control device which controls the actuation of a robot, in which the robot includes a base, a first arm which is connected to the base rotatably around a first rotating axis as a rotation center, a second arm which is connected to the first arm rotatably around a second rotating axis, which is an axis orthogonal to the first rotating axis or an axis parallel to the axis orthogonal to the first rotating axis, as a rotation center, and a third arm which is connected to the second arm rotatably around a third rotating axis, which is an axis parallel to the second rotating axis, as a rotation center, and the robot control device includes a receiving unit which receives signals output from a three-axis inertial sensor, which includes a first detection axis, a second detection axis, and a third detection axis orthogonal to each other, and is provided in the third arm, the first detection axis being parallel to the third rotating axis, a calculation unit which obtains a vibrational component of inertia of the first arm on the basis of signals relating to the second detection axis and the third detection axis among the signals received by the receiving unit and obtains a vibrational component of inertia of the third arm on the basis of a signal relating to the first detection axis among the signals received by the receiving unit, and a control unit which controls the actuation of the robot on the basis of the vibrational component of inertia of the first arm and the vibrational component of inertia of the third arm obtained by the calculation unit.

With this configuration, it is possible to suppress vibration easily and reliably.

That is, the inertia of the third arm including the rotation amount of the first arm and the second arm can be detected by the three-axis inertial sensor. Then, it is possible to suppress vibration on the basis of these detection results. For this reason, it is possible to suppress vibration more reliably.

Even if the posture of the robot changes, for example, even if the first arm rotates and the second arm rotates, the first detection axis of the inertial sensor is constant. For this reason, it is not necessary to correct the angular velocity around the first detection axis of the third arm detected by the inertial sensor by the direction of the inertial sensor. Accordingly, complicated and enormous computation is not required. Therefore, a computation error is less likely to occur, and it is possible to reliably suppress vibration and to increase a response speed in the control of the robot.

Still another aspect of the invention is directed to a robot system including the robot according to the aspect of the invention, and a robot control device which controls the actuation of the robot.

With this configuration, it is possible to suppress vibration easily and reliably.

That is, the inertia of the third arm including the rotation amount of the first arm and the second arm can be detected by the three-axis inertial sensor. Then, it is possible to suppress vibration on the basis of these detection results. For this reason, it is possible to suppress vibration more reliably. It is also possible to reduce the number of inertial sensors, to reduce cost, and to simplify the configuration compared to a case where an inertial sensor is provided in each of the first arm and the second arm.

Even if the posture of the robot changes, for example, even if the first arm rotates and the second arm rotates, the first detection axis of the inertial sensor is constant. For this reason, it is not necessary to correct the angular velocity around the first detection axis of the third arm detected by the inertial sensor by the direction of the inertial sensor. Accordingly, complicated and enormous computation is not required. Therefore, a computation error is less likely to occur, and it is possible to reliably suppress vibration and to increase a response speed in the control of the robot.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a robot, a robot control device, and a robot system according to the invention will be described in detail on the basis of a preferred embodiment shown in the accompanying drawings.

Figure 1:
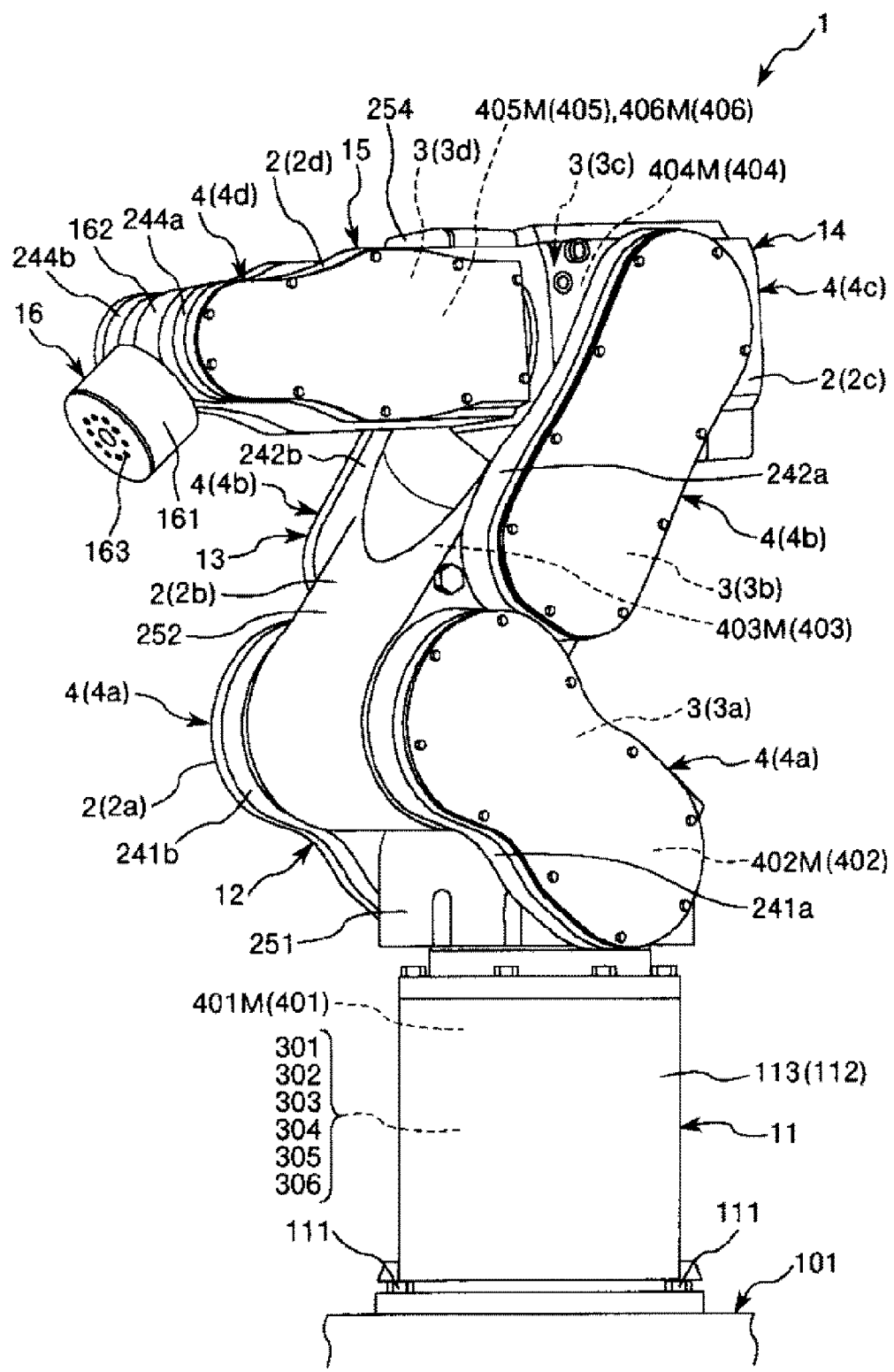
FIG. 1 is a perspective view when a robot according to an embodiment of the invention is viewed from a front side.
Figure 2:
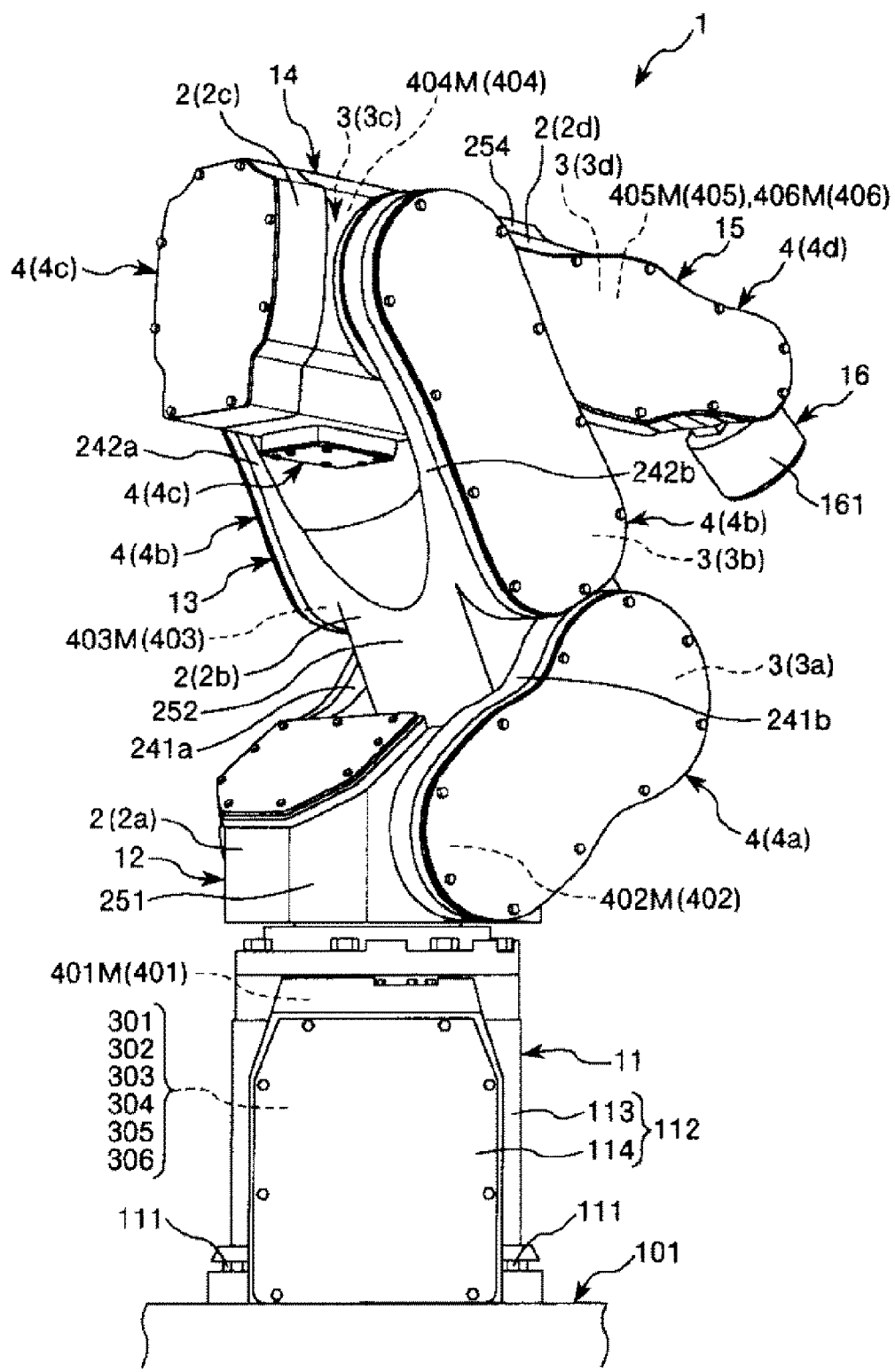
FIG. 2 is a perspective view when the robot shown in FIG. 1 is viewed from a rear side.
Figure 3:
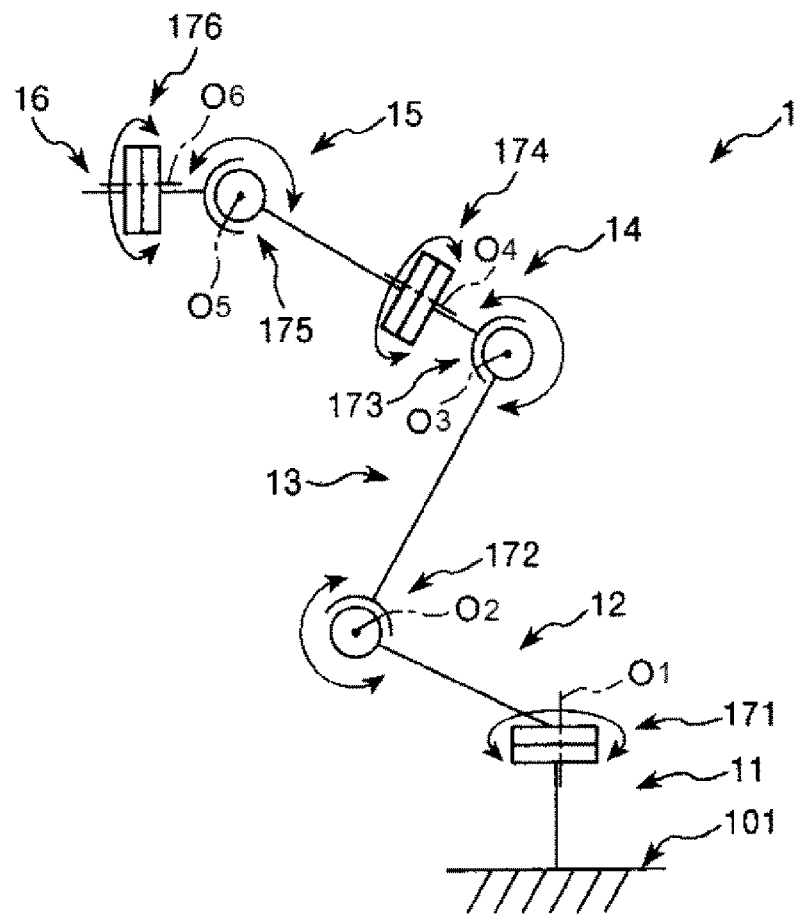
FIG. 3 is a schematic view of the robot shown in FIG. 1.
Figure 4:
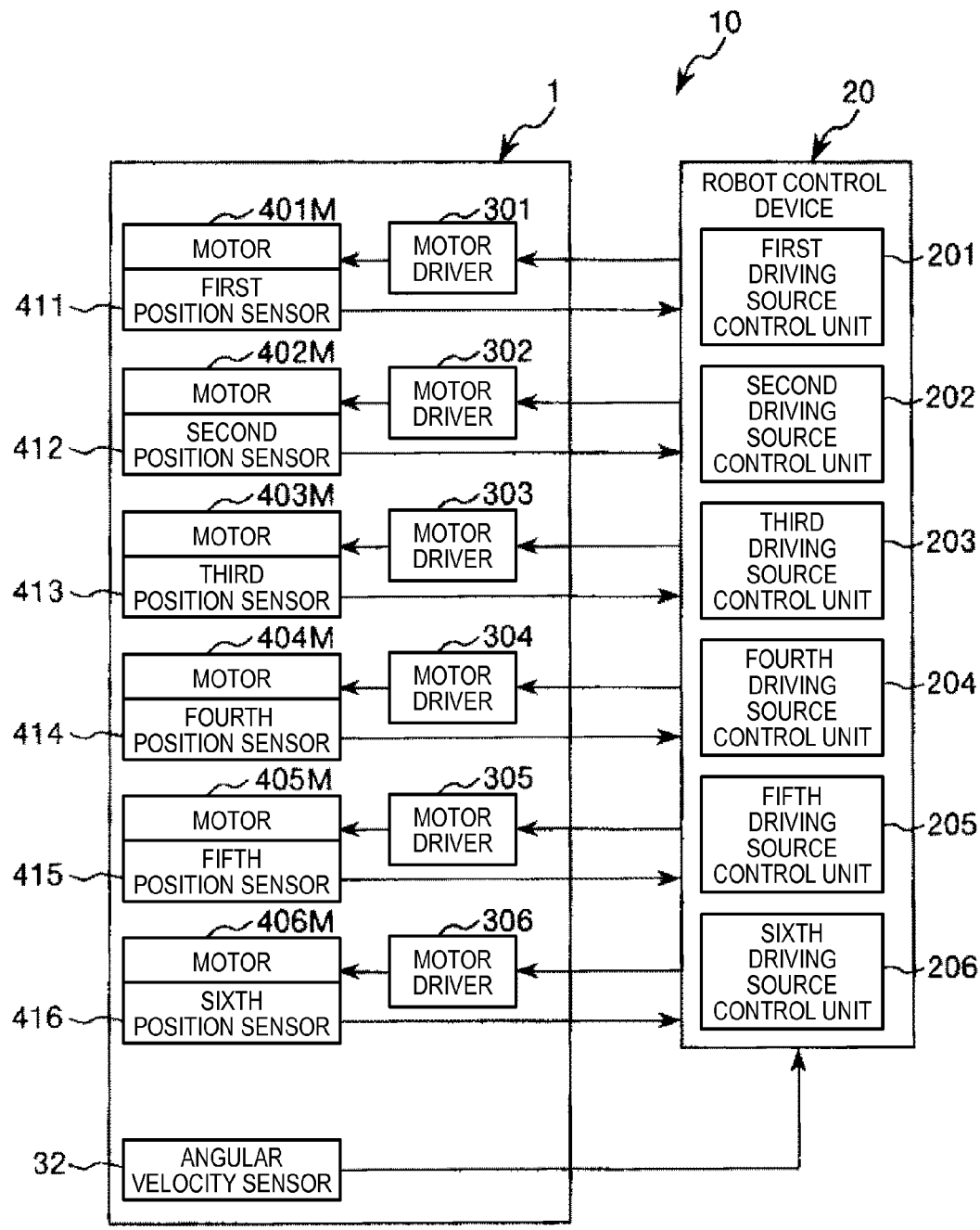
FIG. 4 is a block diagram of a part of a robot system having the robot shown in FIG. 1.
Figure 5:
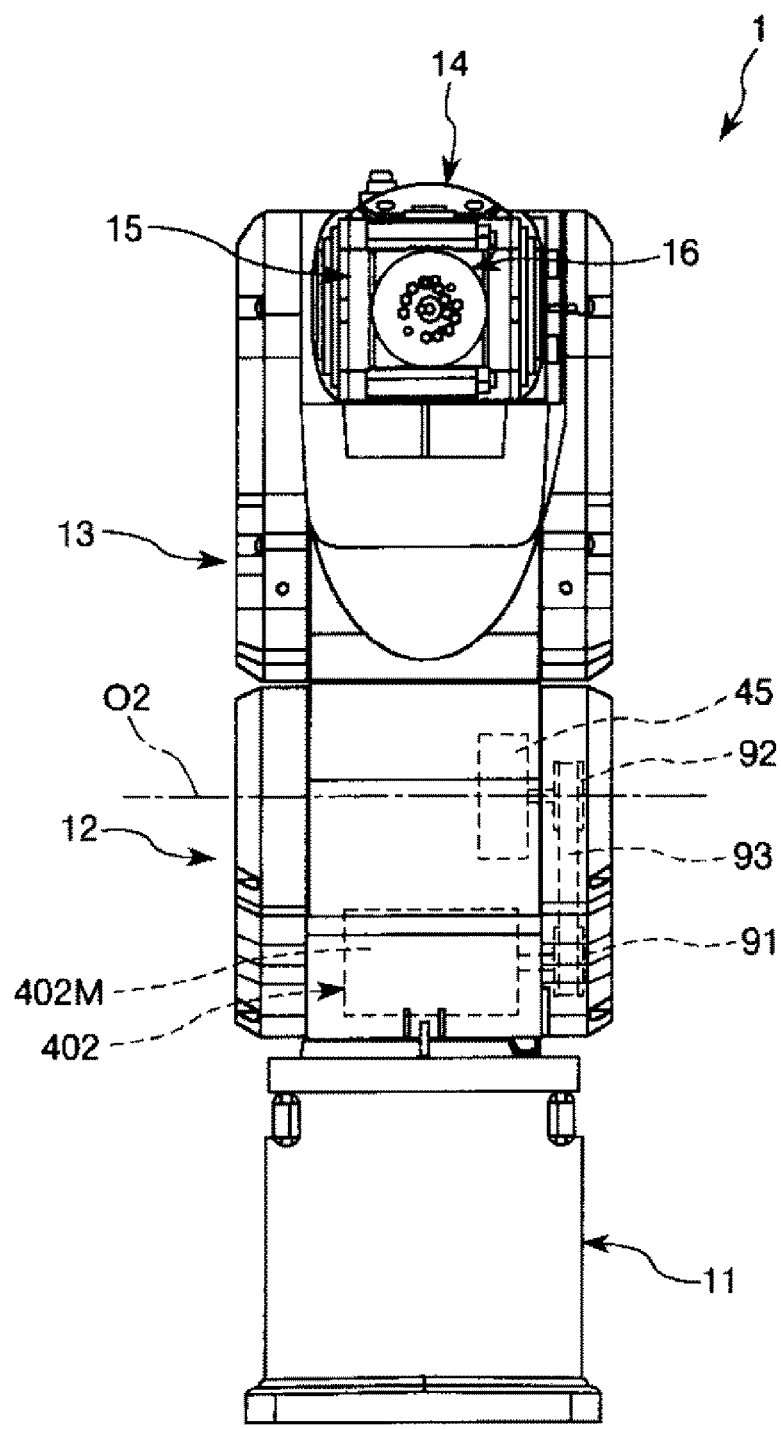
FIG. 5 is a front view of the robot shown in FIG. 1.
Figure 6:
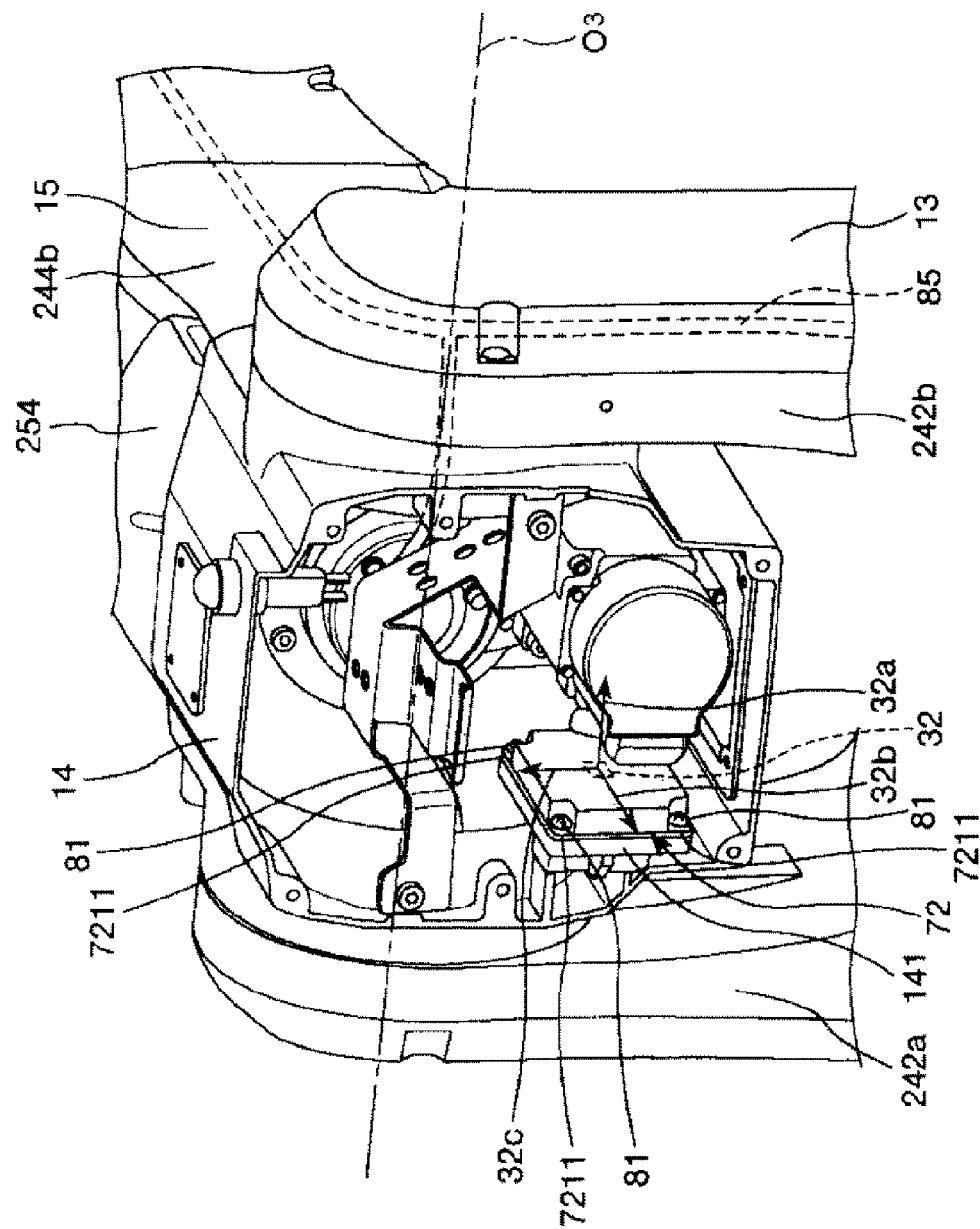
FIG. 6 is a diagram showing the vicinity of an angular velocity sensor in a third arm of the robot shown in FIG. 1.
Figure 7:
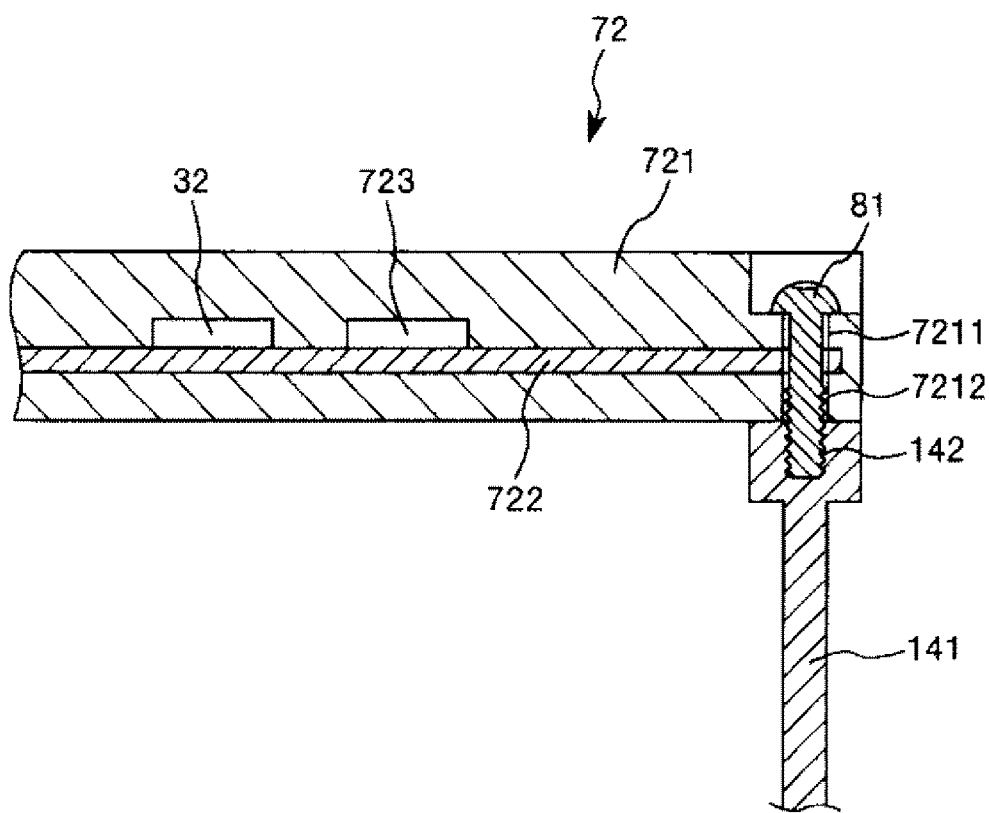
FIG. 7 is a sectional view of an angular velocity sensor unit of the robot shown in FIG. 1.
Figure 8:
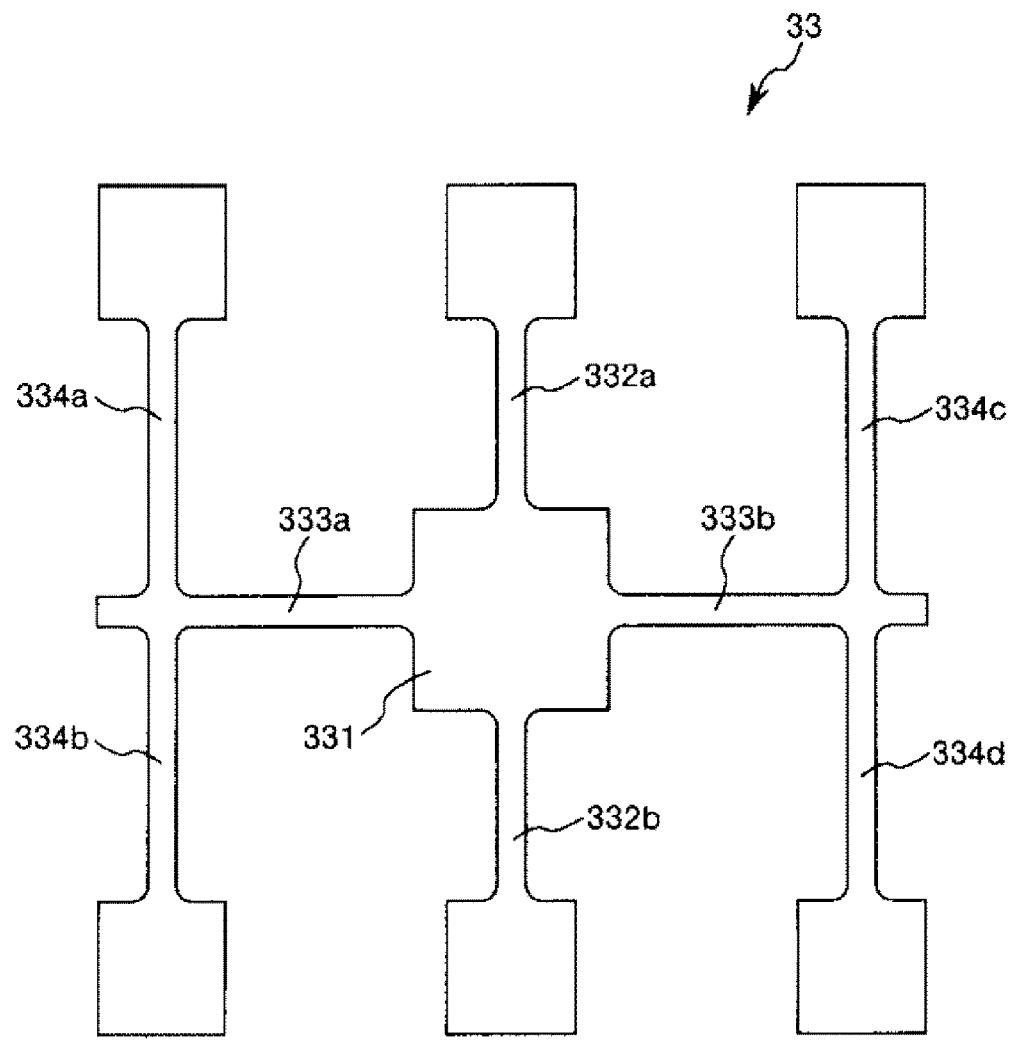
FIG. 8 is a plan view of a gyro element in an angular velocity sensor.
Figure 9A:
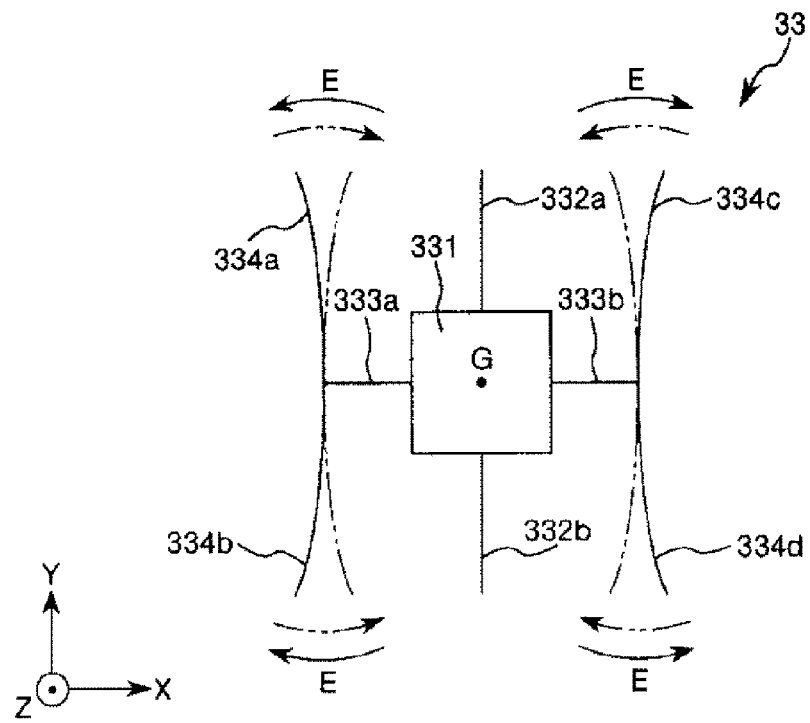
FIGS. 9A and 9B are diagrams showing the actuation of the gyro element shown in FIG. 8.
Figure 9B:
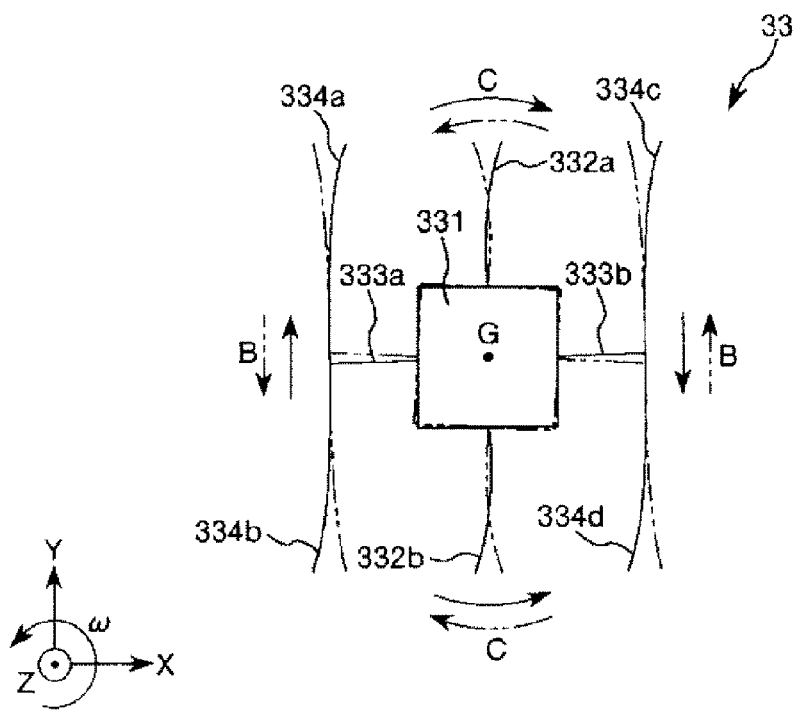

FIG. 1 is a perspective view when a robot according to an embodiment of the invention is viewed from a front side. FIG. 2 is a perspective view when the robot shown in FIG. 1 is viewed from a rear side. FIG. 3 is a schematic view of the robot shown in FIG. 1. FIG. 4 is a block diagram of a part of a robot system having the robot shown in FIG. 1. FIG. 5 is a front view of the robot shown in FIG. 1. FIG. 6 is a diagram showing the vicinity of an angular velocity sensor in a third arm of the robot shown in FIG. 1. FIG. 7 is a sectional view of an angular velocity sensor unit of the robot shown in FIG. 1. FIG. 8 is a plan view of a gyro element in an angular velocity sensor. FIGS. 9A and 9B are diagrams showing the actuation of the gyro element shown in FIG. 8. FIGS. 10 to 14 are block diagrams of a part of the robot shown in FIG. 1.

Hereinafter, for convenience of description, the upper side in FIGS. 1 to 3, 5, and 6 is referred to as "up" or "upward", and the lower side is referred to as "down" or "downward". The base side in FIGS. 1 to 3, 5, and 6 is referred to as "base end", and the opposite side is referred to as "front end".

A robot system (industrial robot system) 10 shown in FIGS. 1 to 4 can be used in, for example, a manufacturing process for manufacturing precision equipment, such as a wristwatch, and has a robot (industrial robot) 1, and a robot control device (control unit) 20 (see FIG. 4) which controls the actuation of the robot 1. The robot 1 and the robot control device 20 are electrically connected together. The robot control device 20 can be constituted by, for example, a personal computer (PC) embedded with a CPU (Central Processing Unit) or the like. The robot control device 20 will be described below in detail.

The robot 1 includes a base 11, four arms (links) 12, 13, 14, and 15, a wrist (link) 16, and six driving sources 401, 402, 403, 404, 405, and 406. The robot 1 is a vertical articulated (six-axis) robot (robot body) in which the base 11, the arms 12, 13, 14, and 15, and the wrist 16 are connected in this order from the base end to the front end. In the vertical articulated robot, the base 11, the arms 12 to 15, and the wrist 16 may be collectively referred to as "arm", the arm 12 may be referred to as a "first arm", the arm 13 may be referred to as a "second arm", the arm 14 may be referred to as a "third arm", the arm 15 may be referred to as a "fourth arm", and the wrist 16 may be referred to as "fifth arm and sixth arm", separately. In this embodiment, the wrist 16 has the fifth arm and the sixth arm. An end effector or the like can be attached to the wrist 16.

The arms 12 to 15 and the wrist 16 are supported to be separately displaceable with respect to the base 11. Although the length of each of the arms 12 to 15 and the wrist 16 is not particularly limited, and in the illustrated configuration, the length of each of the first arm 12, the second arm 13, and the fourth arm 15 is set to be longer than the third arm 14 and the wrist 16.

The base 11 and the first arm 12 are connected together through a joint 171. The first arm 12 has a first rotating axis O1 parallel to a vertical direction as a rotation center with respect to the base 11, and is rotatable around the first rotating axis O1. The first rotating axis O1 matches (is aligned with) the normal to a top surface of a floor 101 which is an installation surface of the base 11. The rotation around the first rotating axis O1 is performed by driving of the first driving source 401 having a motor 401M. The first driving source 401 is driven by the motor 401M and a cable (not shown), and the motor 401M is controlled by the robot control device 20 through a motor driver 301 electrically connected to the motor 401M (see FIG. 4). Although the first driving source 401 may be configured to transmit a driving force from the motor 401M by a speed reducer (not shown) provided along with the motor 401M or a speed reducer may be omitted, in this embodiment, the first driving source 401 has a speed reducer.

The first arm 12 and the second arm 13 are connected together through a joint 172. The second arm 13 is rotatable around a second rotating axis O2 parallel to a horizontal direction as an axial center with respect to the first arm 12. The second rotating axis O2 is orthogonal to the first rotating axis O1. The rotation around the second rotating axis O2 is performed by driving of the second driving source 402 having a motor 402M. The second driving source 402 is driven by the motor 402M and a cable (not shown), and the motor 402M is controlled by the robot control device 20 through a motor driver 302 electrically connected to the motor 402M (see FIG. 4). Although the second driving source 402 may be configured to transmit a driving force from the motor 402M by a speed reducer 45 (see FIG. 5) provided along with the motor 402M or a speed reducer may be omitted, in this embodiment, the second driving source 402 has the speed reducer 45. The second rotating axis O2 may be parallel to an axis orthogonal to the first rotating axis O1.

The second arm 13 and the third arm 14 are connected together through a joint 173. The third arm 14 has a third rotating axis O3 parallel to the horizontal direction as a rotation center with respect to the second arm 13, and is rotatable around the third rotating axis O3. The third rotating axis O3 is parallel to the second rotating axis O2. The rotation around the third rotating axis O3 is performed by driving of the third driving source 403. The third driving source 403 is driven by a motor 403M and a cable (not shown), and the motor 403M is controlled by the robot control device 20 through a motor driver 303 electrically connected to the motor 403M (see FIG. 4). Although the third driving source 403 may be configured to transmit a driving force from the motor 403M by a speed reducer (not shown) provided along with the motor 403M or a speed reducer may be omitted, in this embodiment, the third driving source 403 has a speed reducer.

The third arm 14 and the fourth arm 15 are connected together through a joint 174. The fourth arm 15 has a fourth rotating axis O4 parallel to a center axis direction of the third arm 14 as a rotation center with respect to the third arm 14 (base 11), and is rotatable around the fourth rotating axis O4. The fourth rotating axis O4 is orthogonal to the third rotating axis O3. The rotation around the fourth rotating axis O4 is performed by driving of the fourth driving source 404. The fourth driving source 404 is driven by a motor 404M and a cable (not shown), and the motor 404M is controlled by the robot control device 20 through a motor driver 304 electrically connected to the motor 404M (see FIG. 4). Although the fourth driving source 404 may be configured to transmit a driving force from the motor 404M by a speed reducer (not shown) provided along with the motor 404M or a speed reducer may be omitted, in this embodiment, the fourth driving source 404 has a speed reducer. The fourth rotating axis O4 may be parallel to an axis orthogonal to the third rotating axis O3.

The fourth arm 15 and the wrist 16 are connected together through a joint 175. The wrist 16 has a fifth rotating axis O5 parallel to the horizontal direction as a rotation center with respect to the fourth arm 15, and is rotatable around the fifth rotating axis O5. The fifth rotating axis O5 is orthogonal to the fourth rotating axis O4. The rotation around the fifth rotating axis O5 is performed by driving of the fifth driving source 405. The fifth driving source 405 is driven by a motor 405M and a cable (not shown), and the motor 405M is controlled by the robot control device 20 through a motor driver 305 electrically connected to the motor 405M (see FIG. 4). Although the fifth driving source 405 may be configured to transmit a driving force from the motor 405M by a speed reducer (not shown) provided along with the motor 405M or a speed reducer may be omitted, in this embodiment, the fifth driving source 405 has a speed reducer. The wrist 16 has a sixth rotating axis O6 perpendicular to the fifth rotating axis O5 as a rotation center through a joint 176, and is rotatable around the sixth rotating axis O6. The sixth rotating axis O6 is orthogonal to the fifth rotating axis O5. The rotation around the sixth rotating axis O6 is performed by driving of the sixth driving source 406. The sixth driving source 406 is driven by a motor 406M and a cable (not shown), and the motor 406M is controlled by the robot control device 20 through a motor driver 306 electrically connected to the motor 406M (see FIG. 4). Although the sixth driving source 406 may be configured to transmit a driving force from the motor 406M by a speed reducer (not shown) provided along with the motor 406M or a speed reducer may be omitted, in this embodiment, the sixth driving source 406 has a speed reducer. The fifth rotating axis O5 may be parallel to an axis orthogonal to the fourth rotating axis O4, and the sixth rotating axis O6 may be parallel to an axis orthogonal to the fifth rotating axis O5.

As shown in FIG. 6, the third arm 14 is provided with an angular velocity sensor 32, that is, an angular velocity sensor unit 72 having the angular velocity sensor 32 is provided. The angular velocity around the first rotating axis O1 and the angular velocity around the second rotating axis O2 of the third arm 14 is detected by the angular velocity sensor 32.

In the robot 1, vibration of the first arm 12, the second arm 13, and the third arm 14 is suppressed, thereby suppressing vibration of the entire robot 1. However, in order to suppress vibration of the first arm 12, the second arm 13, and the third arm 14, instead of providing an angular velocity sensor in each of the first arm 12, the second arm 13, and the third arm 14, as described above, the angular velocity sensor 32 is provided only in the third arm 14, and the actuation of the driving sources 401 and 402 is controlled on the basis of the detection result of the angular velocity sensor 32. Accordingly, it is possible to reduce the number of angular velocity sensors, to reduce cost, and to simplify the circuit configuration compared to a case where the angular velocity sensor is provided in each of the first arm 12, the second arm 13, and the third arm 14. Since the angular velocity of the third arm 14 including the rotation amount of the second arm 13 is detected by the angular velocity sensor 32 instead of the angular velocity of the second arm 13, it is possible to more reliably suppress vibration. The actuation of the second driving source 402 which rotates the second arm 13 on the base end side from the third arm 14 is controlled, whereby it is possible to increase the effect of suppressing vibration of the robot 1.

In the driving sources 401 to 406, a first position sensor 411, a second position sensor 412, a third position sensor 413, a fourth position sensor 414, a fifth position sensor 415, and a sixth position sensor 416 are respectively provided in the motors or the speed reducers. These position sensors are not particularly limited, and for example, an encoder, a rotary encoder, a resolver, a potentiometer, or the like may be used. The rotation angles of the shaft portions of the motors or the speed reducers of the driving sources 401 to 406 are detected by the position sensors 411 to 416. The motors of the driving sources 401 to 406 are not particularly limited, and for example, a servomotor, such as an AC servomotor or a DC servomotor, is preferably used. The respective cables may be inserted into the robot 1.

As shown in FIG. 4, the robot 1 is electrically connected to the robot control device 20. That is, the driving sources 401 to 406, the position sensors 411 to 416, and the angular velocity sensor 32 are electrically connected to the robot control device 20.

The robot control device 20 can actuate the arms 12 to 15 and the wrist 16 separately, that is, can control the driving sources 401 to 406 through the motor drivers 301 to 306 separately. In this case, the robot control device 20 performs detection by the position sensors 411 to 416 and the angular velocity sensor 32, and controls the driving of the driving sources 401 to 406, for example, the angular velocity, the rotation angle, or the like on the basis of the detection results. A control program is stored in a recording medium embedded in the robot control device 20 in advance.

As shown in FIGS. 1 and 2, if the robot 1 is a vertical articulated robot, the base 11 is a portion which is located on the lowermost side of the vertical articulated robot and is fixed to the floor 101 of the installation space. A fixing method is not particularly limited, and for example, in this embodiment shown in FIGS. 1 and 2, a fixing method by a plurality of bolts 111 is used. A fixing location of the base 11 in the installation space may be a wall or a ceiling of the installation space, instead of the floor.

The base 11 has a hollow base body (housing) 112. The base body 112 can be divided into a cylindrical portion 113 having a cylindrical shape, and a boxlike portion 114 having a boxlike shape which is formed integrally in the outer circumferential portion of the cylindrical portion 113. In the base body 112, for example, the motor 401M or the motor drivers 301 to 306 are stored.

Each of the arms 12 to 15 has a hollow arm body (housing) 2, a driving mechanism 3, and a sealing unit 4. Hereinafter, for convenience of description, the arm body 2, the driving mechanism 3, and the sealing unit 4 of the first arm 12 are respectively referred to as "arm body 2a", "driving mechanism 3a", and "sealing unit 4a", the arm body 2, the driving mechanism 3, and the sealing unit 4 of the second arm 13 are respectively referred to as "arm body 2b", "driving mechanism 3b", and "sealing unit 4b", the arm body 2, the driving mechanism 3, and the sealing unit 4 of the third arm 14 are respectively referred to as "arm body 2c", "driving mechanism 3c", and "sealing unit 4c", and the arm body 2, the driving mechanism 3, and the sealing unit 4 of the fourth arm 15 are respectively referred to as "arm body 2d", "driving mechanism 3d", and "sealing unit 4d".

Each of the joints 171 to 176 has a rotation support mechanism (not shown). The rotation support mechanism is a mechanism which rotatably supports one of two arms connected together with respect to the other arm, a mechanism which rotatably supports one of the base 11 and the first arm 12 connected together with respect to the other, or a mechanism which rotatably supports one of the fourth arm 15 and the wrist 16 connected together with respect to the other. In an example of the fourth arm 15 and the wrist 16 connected together, the rotation support mechanism can rotate the wrist 16 with respect to the fourth arm 15. Each rotation support mechanism has a speed reducer (not shown) which reduces the rotation speed of the corresponding motor at a predetermined reduction ratio, and transmits the driving force to the corresponding arm, a wrist body 161 of the wrist 16, and a support ring 162. As described above, in this embodiment, the speed reducer and the motor are referred to as a driving source.

The first arm 12 is connected to the upper end portion (front end portion) of the base 11 in a posture inclined with respect to the horizontal direction. In the first arm 12, the driving mechanism 3a has the motor 402M and is stored in the arm body 2a. The arm body 2a is sealed airtight by the sealing unit 4a. The arm body 2a has a pair of tongue piece portions 241a and 241b on the front end side, and a root portion 251 on the base end side. The tongue piece portion 241a and the tongue piece portion 241b are separated from each other and opposite to each other. The tongue piece portions 241a and 241b are inclined with respect to the root portion 251, and thus, the first arm 12 is inclined with respect to the horizontal direction. A base end portion of the second arm 13 is arranged between the tongue piece portion 241a and the tongue piece portion 241b.

Here, for the driving mechanism 3 and the speed reducer, representatively, the driving mechanism 3 which is provided in the arm body 2a of the first arm 12 and rotates the second arm 13 will be described.

As shown in FIG. 5, the driving mechanism 3 has a first pulley 91 which is connected to the shaft portion of the motor 402M, a second pulley 92 which is arranged to be separated from the first pulley 91, and a belt (timing belt) 93 which is stretched between the first pulley 91 and the second pulley 92. The second pulley 92 and the shaft portion of the second arm 13 are connected together by the speed reducer 45.

The speed reducer 45 is not particularly limited, and for example, a speed reducer having a plurality of gears, a harmonic drive ("Harmonic Drive" is Registered Trademark), or the like may be used.

A main cause for vibration of the arms 12 to 15 and the wrist 16 of the robot 1 is, for example, distortion or deflection of the speed reducer 45, expansion and contraction of the belt 93, deflection of the arms 12 to 15 and the wrist 16, or the like.

The second arm 13 is connected to a front end portion of the first arm 12. In the second arm 13, the driving mechanism 3b has the motor 403M and is stored in the arm body 2b. The arm body 2a is sealed airtight by the sealing unit 4b. The arm body 2b has a pair of tongue piece portions 242a and 242b on the front end side, and a root portion 252 on the base end side. The tongue piece portion 242a and the tongue piece portion 242b are separated from each other and opposite to each other. A base end portion of the third arm 14 is arranged between the tongue piece portion 242a and the tongue piece portion 242b.

The third arm 14 is connected to a front end portion of the second arm 13. In the third arm 14, the driving mechanism 3c has the motor 404M and is stored in the arm body 2c. The arm body 2c is sealed airtight by the sealing unit 4c. The arm body 2c is constituted by a member corresponding to the root portion 251 of the arm body 2a and the root portion 252 of the arm body 2b.

The installation position of the angular velocity sensor 32 in the third arm 14 is not particularly limited, and in this embodiment, as shown in FIG. 6, the angular velocity sensor 32, that is, the angular velocity sensor unit 72 is provided in an end portion of the arm body 2c of the third arm 14 on an opposite side to an internal cable 85. Accordingly, it is possible to prevent the angular velocity sensor 32 from being affected by noise from the cable 85, and to prevent a circuit unit 723 of the angular velocity sensor unit 72, a wiring, and the angular velocity sensor 32 from being short-circuited by the cable 85.

The fourth arm 15 is connected to a front end portion of the third arm 14 in parallel with the center axis direction. In the fourth arm 15, the driving mechanism 3d has the motors 405M and 406M and is stored in the arm body 2d. The arm body 2d is sealed airtight by the sealing unit 4d. The arm body 2d has a pair of tongue piece portions 244a and 244b on the front end side, and a root portion 254 on the base end side. The tongue piece portion 244a and the tongue piece portion 244b are separated from each other and opposite to each other. A support ring 162 of the wrist 16 is arranged between the tongue piece portion 244a and the tongue piece portion 244b.

The wrist 16 is connected to a front end portion (an end portion on an opposite side to the base 11) of the fourth arm 15. In the wrist 16, for example, a manipulator (not shown) which holds precision equipment, such as a wristwatch, is detachably mounted as a functional unit (end effector) in the front end portion (the end portion on an opposite side to the fourth arm 15). The manipulator is not particularly limited, and for example, a configuration in which a plurality of finger portions are provided may be used. The robot 1 controls the operations of the arms 12 to 15, the wrist 16, and the like while holding the precision equipment with the manipulator, thereby conveying the precision equipment.

The wrist 16 has a cylindrical wrist body (sixth arm) 161, and the ring-shaped support ring (fifth arm) 162 which is constituted separately from the wrist body 161 and is provided in the base end portion of the wrist body 161.

A front end surface 163 of the wrist body 161 is a flat surface, and becomes a mounting surface on which the manipulator is mounted. The wrist body 161 is connected to the driving mechanism 3d of the fourth arm 15 through the joint 176, and rotates around the sixth rotating axis O6 by driving of the motor 406M of the driving mechanism 3d.

The support ring 162 is connected to the driving mechanism 3d of the fourth arm 15 through the joint 175, and rotates around the fifth rotating axis O5 along with the wrist body 161 by driving of the motor 405M of the driving mechanism 3d.

A constituent material of the arm body 2 is not particularly limited, and for example, various metal materials may be used and of these, aluminum or an aluminum alloy is particularly preferably used. If the arm body 2 is a casting which is molded using a mold, aluminum or an aluminum alloy is used as the constituent material of the arm body 2, whereby it is possible to easily perform metallic molding.

A constituent material of each of the base body 112 of the base 11, the wrist body 161 of the wrist 16, and the support ring 162 is not particularly limited, and for example, the same material as the constituent material of the arm body 2 may be used. As a constituent material of the wrist body 161 of the wrist 16, stainless steel is preferably used.

A constituent material of the sealing unit 4 is not particularly limited, and for example, various resin materials and various metal materials may be used. A resin material is used as the constituent material of the sealing unit 4, whereby it is possible to achieve reduction in weight.

Next, the angular velocity sensor unit 72 will be described.

As shown in FIG. 7, the angular velocity sensor unit (inertial sensor unit) 72 has a housing 721, and a circuit board 722 having a wiring and an angular velocity sensor (inertial sensor) 32 and a circuit unit 723 electrically connected onto the circuit board 722, which are provided in the housing 721. In this embodiment, the housing 721 is made of a sealing material, and the angular velocity sensor 32, the circuit unit 723, and the circuit board 722 are collectively sealed by the sealing material. In this way, the angular velocity sensor 32 and the circuit unit 723 are packaged, thereby simplifying the configuration.

The circuit unit 723 has an AD conversion unit which performs AD conversion on the signal output from the angular velocity sensor 32, that is, converts an analog signal to a digital signal, and a transmitting unit which transmits the converted signal to the robot control device 20.

The appearance of the housing 721 is a cube.

The angular velocity sensor 32 is a three-axis angular velocity sensor which includes a first detection axis 32a, a second detection axis 32b, and a third detection axis 32c, which are orthogonal to each other, and can separately detect the angular velocity around the first detection axis 32a, the angular velocity around the second detection axis 32b, and the angular velocity around the third detection axis 32c. The configuration of the angular velocity sensor 32 is not particularly limited insofar as the angular velocity around each axis can be detected, and for example, a configuration in which three gyro elements 33 each including one detection axis are prepared, and these are arranged such that the detection axes are orthogonal to each other may be used. The configuration of each gyro element 33 is not particularly limited, and for example, the following gyro element may be used. Hereinafter, as shown in FIGS. 8 and 9, the axes orthogonal to each other are defined as an X axis, a Y axis, and a Z axis.

As shown in FIG. 8, the gyro element 33 has a quartz substrate having a base portion 331, a pair of detection vibrating arms 332a and 332b which extend from both sides of the base portion 331 in the Y-axis direction and in opposite directions, a pair of connecting arms 333a and 333b which extend from both sides of the base portion 331 in the X-axis direction and in opposite directions, a pair of driving vibrating arms 334a and 334b which extend from both sides of a front end portion of the connecting arm 333a in the Y-axis direction and in opposite directions, and a pair of driving vibrating arms 334c and 334d which extend from both sides of a front end portion of the connecting arm 333b in the Y-axis direction and in opposite directions, detection electrodes (not shown) which are provided in the respective detection vibrating arms 332a and 332b, and driving electrodes (not shown) which are provided in the respective driving vibrating arms 334a, 334b, 334c, and 334d.

The gyro element 33 is actuated as follows. In FIGS. 9A and 9B, the respective vibrating arms are represented by lines so as to easily express a vibration form.

First, as shown in FIG. 9A, in a state where the angular velocity is not applied to the gyro element 33, a voltage is applied to the driving electrodes to cause bending vibration of the respective driving vibrating arms 334a, 334b, 334c, and 334d in a direction indicated by arrow E. In the bending vibration, a vibration mode indicated by a solid line and a vibration mode indicated by a two-dot-chain line are repeated at a predetermined frequency. At this time, the driving vibrating arms 334a and 334b and the driving vibrating arms 334c and 334d vibrate line-symmetrically with respect to the Y axis passing through the center of gravity G.

As shown in FIG. 9B, in a state where the vibration is performed, if an angular velocity ω around the Z axis (detection axis) is applied to the gyro element 33, a Coriolis force in a direction of arrow B acts on the driving vibrating arms 334a, 334b, 334c, and 334d and the connecting arms 333a and 333b, and renewed vibration is excited in these arms. Simultaneously, vibration in a direction of arrow C in response to vibration indicated by arrow B is excited in the detection vibrating arms 332a and 332b. A signal (voltage) according to strain of the detection vibrating arms 332a and 332b caused by vibration of the detection vibrating arms 332a and 332b is output from the detection electrodes.

In the above, the gyro element 33 has been simply described.

The first detection axis 32a of the angular velocity sensor 32 matches (is aligned with) the normal to the largest surface (hereinafter, referred to as "principal surface") of the rectangular parallelepiped of the housing 721. The second detection axis 32b of the angular velocity sensor 32 matches (is aligned with) the normal to a set of opposite lateral surfaces among four lateral surfaces connected to the principal surface, and the third detection axis 32c matches (is aligned with) the normal to the other set of lateral surfaces. With this, it is possible to allow the directions of the three detection axes of the angular velocity sensor 32 to be recognized easily and reliably, and to allow the angular velocity sensor 32 to take an appropriate posture easily. Then, as shown in FIG. 6, the angular velocity sensor unit 72 is provided such that the first detection axis 32a is parallel to the third rotating axis O3.

As shown in FIGS. 6 and 7, the housing 721 has attachment portions 7211 to be attached to the third arm 14 in four corner portions. In each attachment portion 7211, a hole 7212 into which the screw 81 is inserted is formed.

As shown in FIG. 6, the third arm 14 has an arm-side attachment portion 141 which is formed integrally with the arm body 2c and to which the angular velocity sensor unit 72 (housing 721) is attached. The arm-side attachment portion 141 has a shape corresponding to the housing 721. That is, the arm-side attachment portion 141 has a plate shape, and the shape in plan view is a quadrangular shape, in this embodiment, a rectangular shape. In each corner portion of the arm-side attachment portion 141, a threaded bore 142 into which the screw 81 is threaded is formed.

The term "integrally" in the arm-side attachment portion 141 formed integrally with the arm body 2c refers to a case where the arm body 2c and the arm-side attachment portion 141 are formed simultaneously by, for example, die-casting or the like, instead of forming members separately and bonding the members.

When attaching the angular velocity sensor unit 72 to the third arm 14, four screws 81 are inserted into the holes 7212 of the housing 721 and threaded into the threaded bores in the front end portions of the arm-side attachment portions 141 of the third arm 14. With this, the four attachment portions 7211 of the housing 721 are fixed to the arm-side attachment portion 141 of the third arm 14 by the screws 81. That is, the angular velocity sensor unit 72 is attached to the arm-side attachment portion 141 of the third arm 14. In this case, there is nothing between the arm-side attachment portion 141 and the angular velocity sensor unit 72, that is, the angular velocity sensor unit 72 is directly attached to the arm-side attachment portion 141. With this, it is possible to attach the angular velocity sensor unit 72 to the third arm 14 reliably, and to allow the angular velocity sensor unit 72 to rotate integrally with the third arm 14 reliably.

The term "directly" when the angular velocity sensor unit 72 is directly attached to the arm-side attachment portions 141 refers to a case excluding a case where the angular velocity sensor unit 72 is attached to an intermediate, such as a separate substrate, and the intermediate is attached to the arm-side attachment portions 141. That is, the term "directly" refers to a case where there is nothing, excluding an adhesive or the like, between the arm-side attachment portions 141 and the angular velocity sensor unit 72.

The screws 81 are conductive and are formed of, for example, various metal materials. If the screws 81 are inserted into the holes 7212 of the housing 721 and are threaded into the threaded bores 142 of the arm-side attachment portions 141, the screws 81 are electrically connected to the wiring of the circuit board 722 electrically connected to a ground terminal of the circuit unit 723, and the front end portions of the screws 81 are electrically connected to the arm-side attachment portions 141. With this, the ground terminal of the circuit unit 723 is electrically connected to the arm body 2c of the third arm 14 through the wiring and the screws 81 and grounded. Accordingly, it is possible to reduce the number of components for grounding and to simplify the configuration.

Next, the configuration of the robot control device 20 will be described referring to FIGS. 4 and 10 to 14.

The robot control device 20 has a receiving unit which receives signals (specifically, a first signal relating to the first detection axis, a second signal relating to the second detection axis, and a third signal relating to the third detection axis) output from the angular velocity sensor 32 and the respective signals output from the position sensors 411 to 416, a calculation unit which obtains a vibrational component of the angular velocity of the first arm 12 and a vibrational component of the composite angular velocity of the second arm 13 and the third arm 14 on the basis of the respective signals received by the receiving unit, and a control unit which controls the actuation of the robot 1 on the basis of the vibrational component of the angular velocity of the first arm 12 and the vibrational component of the angular velocity of the third arm 14 obtained by the calculation unit.

Specifically, as shown in FIGS. 4 and 10 to 14, the robot control device 20 has the receiving unit, a first driving source control unit 201 which controls the actuation of the first driving source 401, a second driving source control unit 202 which controls the actuation of the second driving source 402, a third driving source control unit 203 which controls the actuation of the third driving source 403, a fourth driving source control unit 204 which controls the actuation of the fourth driving source 404, a fifth driving source control unit 205 which controls the actuation of the fifth driving source 405, and a sixth driving source control unit 206 which controls the actuation of the sixth driving source 406.

The calculation unit has a below-described angular velocity calculation unit 561 and a subtracter 571 of the first driving source control unit 201, a below-described angular velocity calculation unit 562 and an adder-subtracter 622 of the second driving source control unit 202, and a below-described angular velocity calculation unit 563 of the third driving source control unit 203.

Figure 10:
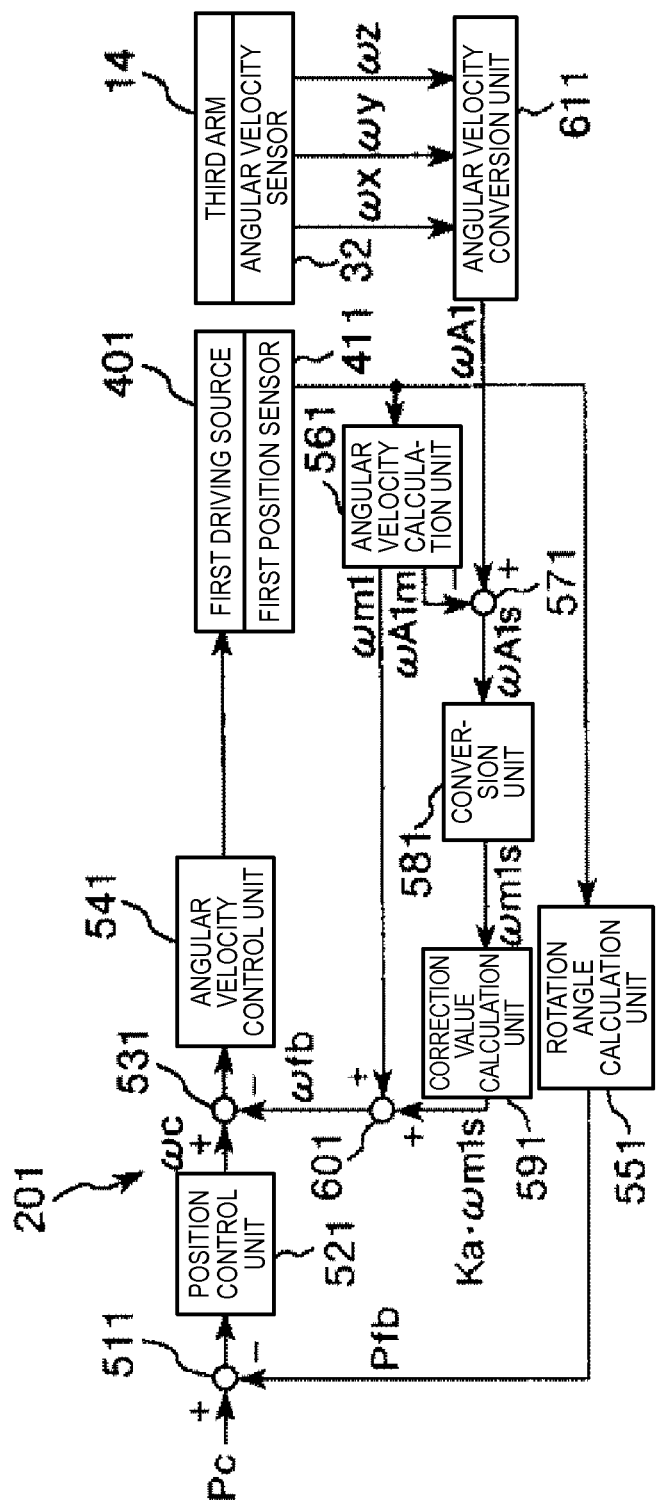
FIG. 10 is a block diagram of a part of the robot shown in FIG. 1.

As shown in FIG. 10, the first driving source control unit 201 has a subtracter 511, a position control unit 521, a subtracter 531, an angular velocity control unit 541, a rotation angle calculation unit 551, an angular velocity calculation unit 561, a subtracter 571, a conversion unit 581, a correction value calculation unit 591, and an adder 601.

Figure 11:
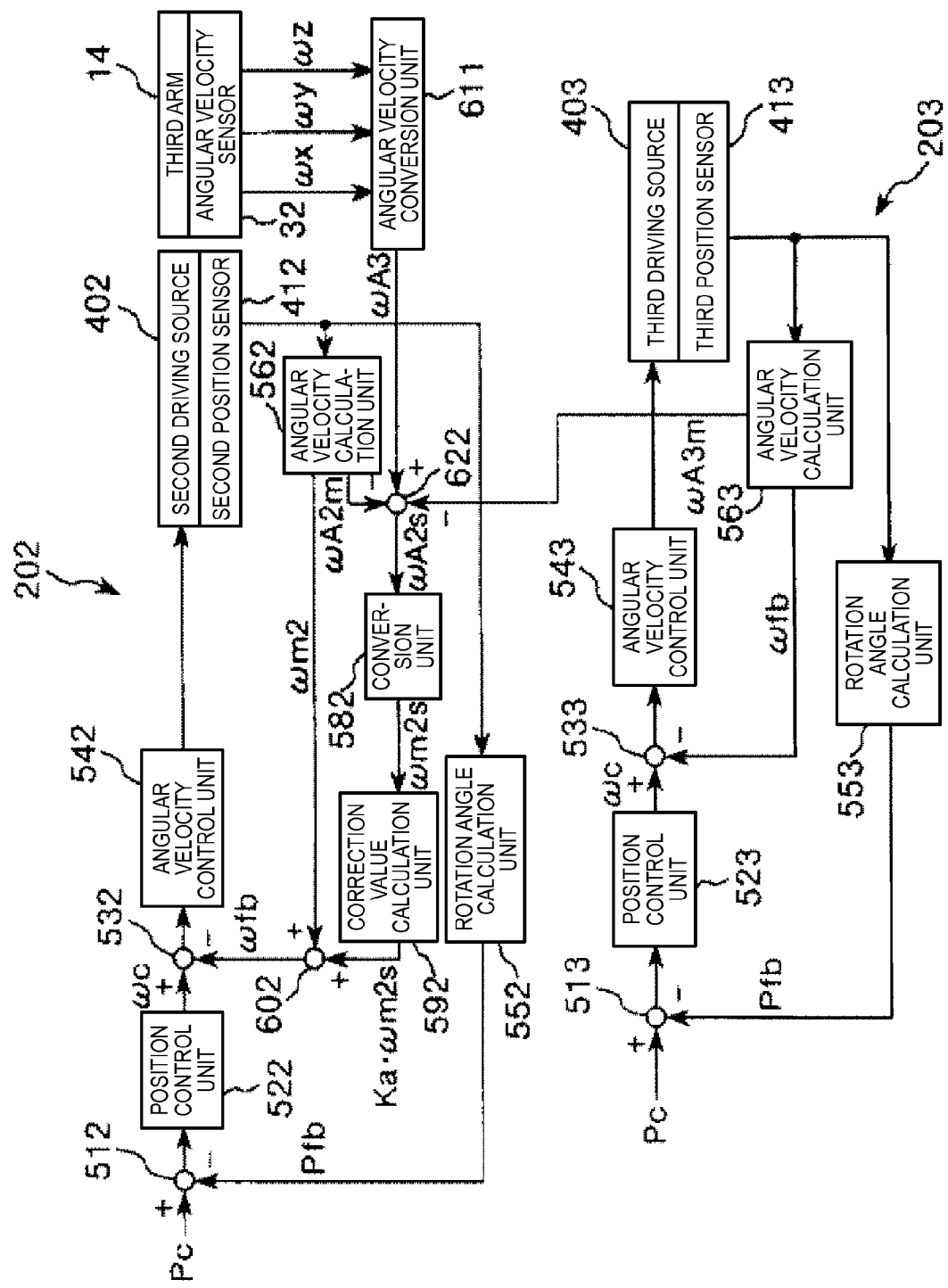
FIG. 11 is a block diagram of a part of the robot shown in FIG. 1.

As shown in FIG. 11, the second driving source control unit 202 has a subtracter 512, a position control unit 522, a subtracter 532, an angular velocity control unit 542, a rotation angle calculation unit 552, an angular velocity calculation unit 562, an adder-subtracter 622, a conversion unit 582, a correction value calculation unit 592, and an adder 602.

As shown in FIG. 11, the third driving source control unit 203 has a subtracter 513, a position control unit 523, a subtracter 533, an angular velocity control unit 543, a rotation angle calculation unit 553, and an angular velocity calculation unit 563.

Figure 12:
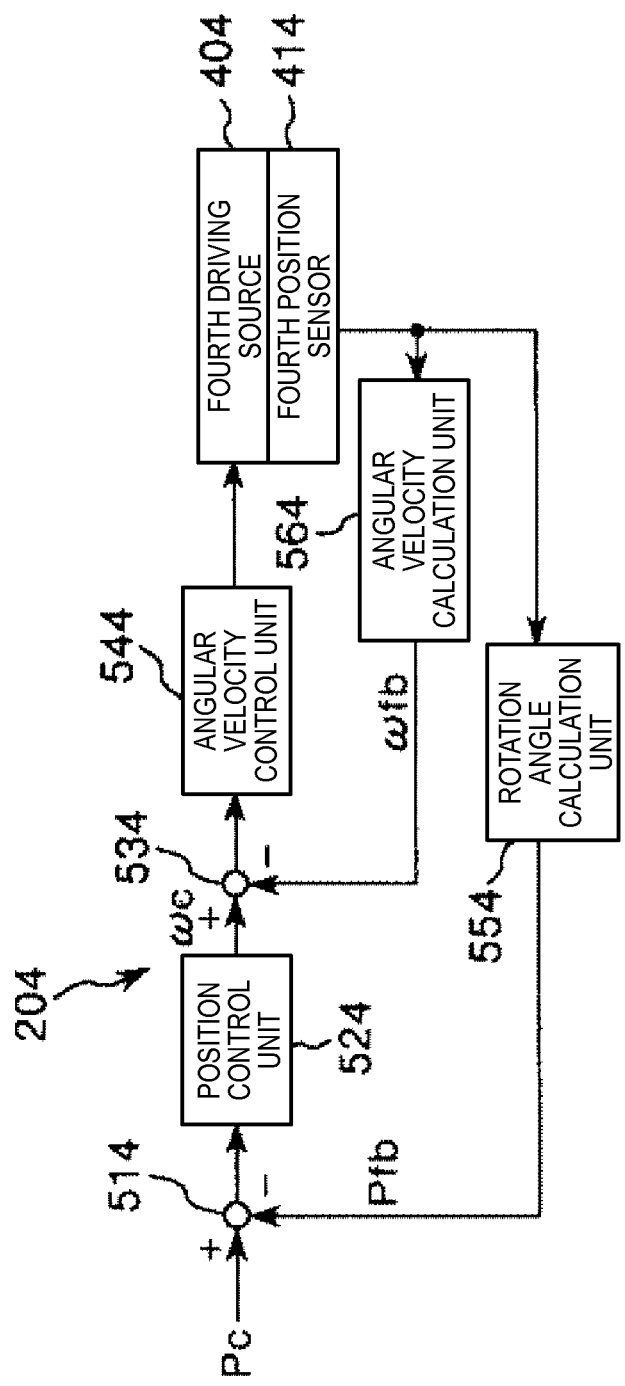
FIG. 12 is a block diagram of a part of the robot shown in FIG. 1.

As shown in FIG. 12, the fourth driving source control unit 204 has a subtracter 514, a position control unit 524, a subtracter 534, an angular velocity control unit 544, a rotation angle calculation unit 554, and an angular velocity calculation unit 564.

Figure 13:
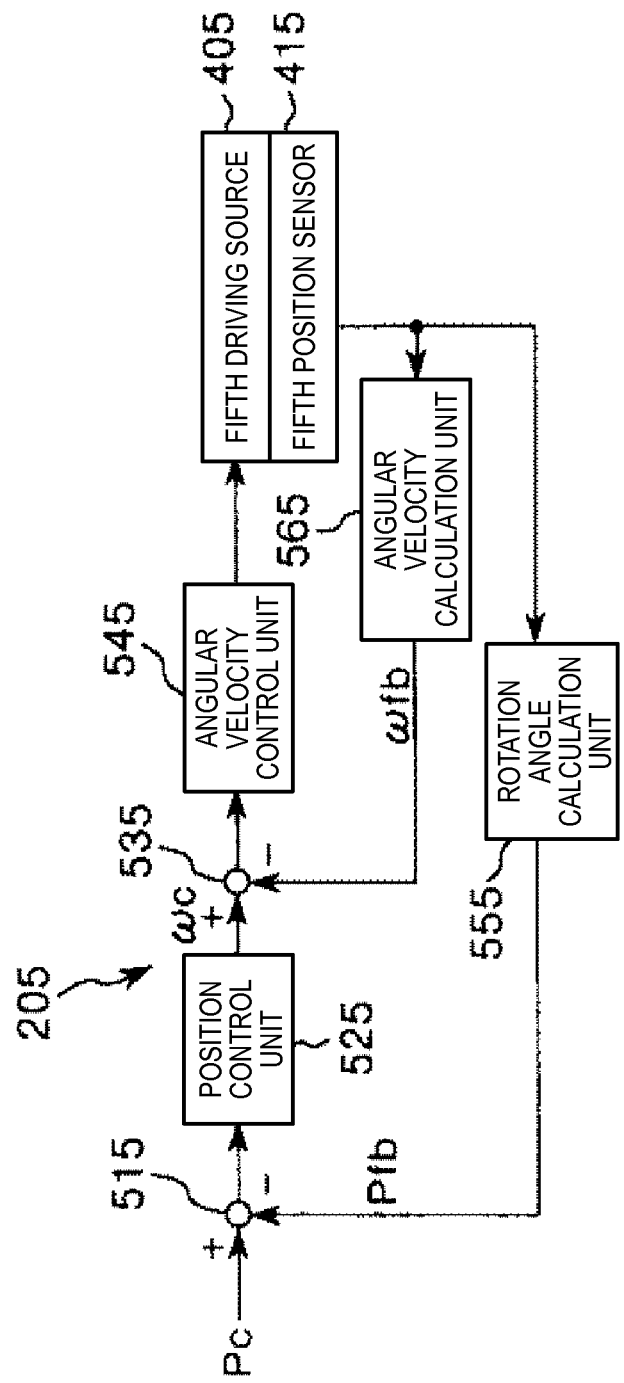
FIG. 13 is a block diagram of a part of the robot shown in FIG. 1.

As shown in FIG. 13, the fifth driving source control unit 205 has a subtracter 515, a position control unit 525, a subtracter 535, an angular velocity control unit 545, a rotation angle calculation unit 555, and an angular velocity calculation unit 565.

Figure 14:
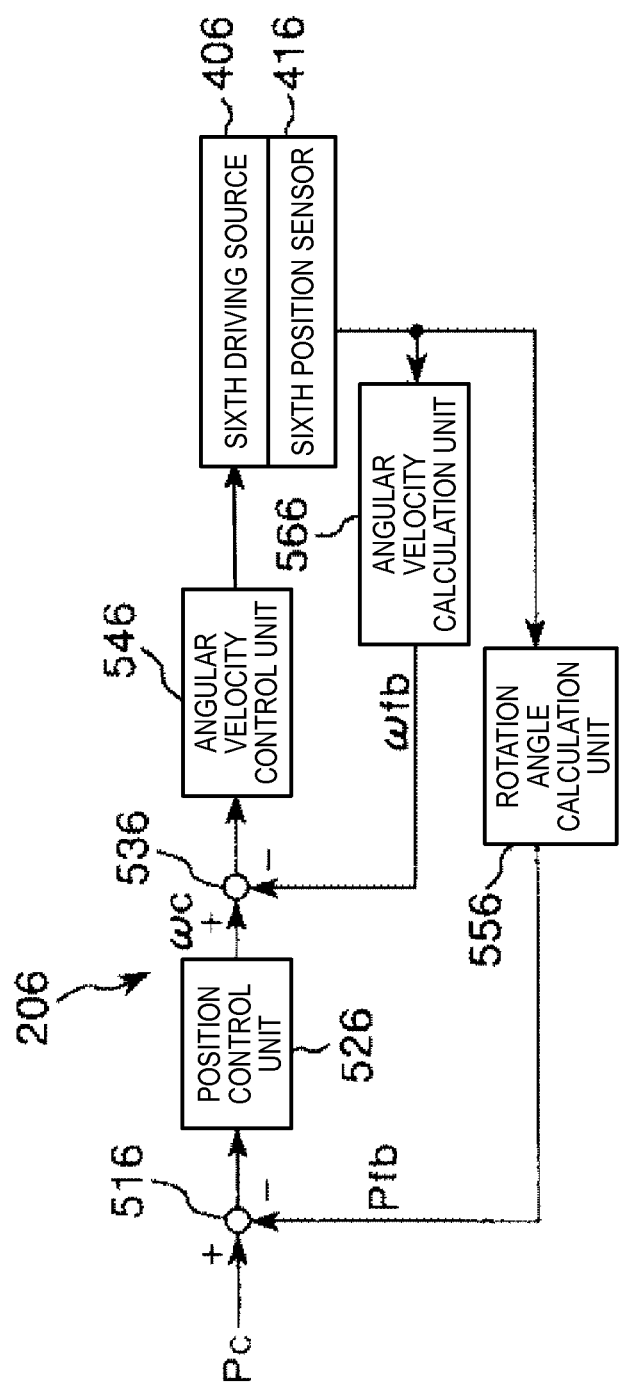
FIG. 14 is a block diagram of a part of the robot shown in FIG. 1.

As shown in FIG. 14, the sixth driving source control unit 206 has a subtracter 516, a position control unit 526, a subtracter 536, an angular velocity control unit 546, a rotation angle calculation unit 556, and an angular velocity calculation unit 566.

Here, the robot control device 20 calculates a target position of the wrist 16 on the basis of the content of processing performed by the robot 1, and produces a track for moving the wrist 16 to the target position. The robot control device 20 measures the rotation angle of each of the driving sources 401 to 406 at every predetermined control period such that the wrist 16 moves along the produced track, and outputs values calculated on the basis of the measurement results to the driving source control units 201 to 206 as a position command Pc of each of the driving sources 401 to 406 (see FIGS. 10 to 14). In the above and following description, the description "the values are input and output" or the like means that "signals corresponding to the values are input and output".

As shown in FIG. 10, in addition to the position command Pc of the first driving source 401, the detection signals from the first position sensor 411 and the angular velocity sensor 32 are input to the first driving source control unit 201. The first driving source control unit 201 drives the first driving source 401 by feedback control using the respective detection signals such that the rotation angle (position feedback value Pfb) of the first driving source calculated from the detection signal of the first position sensor 411 becomes the position command Pc and a below-described angular velocity feedback value ωfb becomes a below-described angular velocity command ωc.

That is, the position command Pc and a below-described position feedback value Pfb from the rotation angle calculation unit 551 are input to the subtracter 511 of the first driving source control unit 201. In the rotation angle calculation unit 551, the number of pulses input from the first position sensor 411 is counted, and the rotation angle of the first driving source 401 according to the count value is output to the subtracter 511 as the position feedback value Pfb. The subtracter 511 outputs the deviation (the value obtained by subtracting the position feedback value Pfb from a target value of the rotation angle of the first driving source 401) between the position command Pc and the position feedback value Pfb to the position control unit 521.

The position control unit 521 performs predetermined calculation processing using the deviation input from the subtracter 511, and a proportional gain or the like as a preset coefficient, and calculates a target value of the angular velocity of the first driving source 401 according to the deviation. The position control unit 521 outputs a signal representing the target value (command value) of the angular velocity of the first driving source 401 to the subtracter 531 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 531. The subtracter 531 outputs the deviation (the value obtained by subtracting the angular velocity feedback value ωfb from the target value of the angular velocity of the first driving source 401) between the angular velocity command ωc and the angular velocity feedback value ωfb to the angular velocity control unit 541.

The angular velocity control unit 541 performs predetermined calculation processing including integration using the deviation input from the subtracter 531, and a proportional gain, an integral gain, and the like as preset coefficients, produces a driving signal (driving current) of the first driving source 401 according to the deviation, and supplies the driving signal to the motor 401M through the motor driver 301. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the first driving source 401 is controlled.

Next, the angular velocity feedback value ωfb in the first driving source control unit 201 will be described.

In the angular velocity calculation unit 561, an angular velocity ωm1 of the first driving source 401 is calculated on the basis of the frequency of a pulse signal input from the first position sensor 411, and the angular velocity ωm1 is output to the adder 601.

In the angular velocity calculation unit 561, an angular velocity ωA1m around the first rotating axis O1 of the first arm 12 is calculated on the basis of the frequency of the pulse signal input from the first position sensor 411, and the angular velocity ωA1m is output to the subtracter 571. The angular velocity ωA1m is a value obtained by dividing the angular velocity ωm1 by a reduction ratio between the motor 401M of the first driving source 401 and the first arm 12, that is, in the joint 171.

An angular velocity ω1 around the first detection axis, an angular velocity ω2 around the second detection axis, and an angular velocity ω3 around the third detection axis are detected by the angular velocity sensor 32, and the respective angular velocities ω1, ω2, and ω3 are input to an angular velocity conversion unit 611. In the angular velocity conversion unit 611, an angular velocity ωA1 around the first rotating axis O1 of the first arm 12 is calculated from the input angular velocities ω2 and ω3, and the angular velocity ωA1 is output to the subtracter 571.

The angular velocity ωA1 and the angular velocity ωA1m are input to the subtracter 571, and the subtracter 571 outputs a value ωA1s (=ωA1−ωA1m) obtained by subtracting the angular velocity ωA1m from the angular velocity ωA1 to the conversion unit 581. The value ωA1s corresponds to a vibrational component (vibrational angular velocity) of the angular velocity around the first rotating axis O1 of the first arm 12. Hereinafter, ωA1s is referred to as a vibrational angular velocity. In this embodiment, feedback control is performed to return a below-described gain Ka multiple of the vibrational angular velocity ωA1s (in detail, an angular velocity ωm1s in the motor 401M which is a value produced on the basis of the vibrational angular velocity ωA1s) to the input side of the first driving source 401. Specifically, the feedback control is performed on the first driving source 401 such that the vibrational angular velocity ωA1s becomes 0 as much as possible. Accordingly, it is possible to suppress vibration of the robot 1. In the feedback control, the angular velocity of the first driving source 401 is controlled.

The conversion unit 581 converts the vibrational angular velocity ωA1s to the angular velocity ωm1s in the first driving source 401, and outputs the angular velocity ωm1s to the correction value calculation unit 591. The conversion can be performed by multiplying the vibrational angular velocity ωA1s by a reduction ratio between the motor 401M of the first driving source 401 and the first arm 12, that is, in the joint 171.

The correction value calculation unit 591 multiplies the angular velocity ωm1s by the gain (feedback gain) Ka as a preset coefficient, obtains a correction value Ka·ωm1s, and outputs the correction value Ka·ωm1s to the adder 601. The angular velocity ωm1 and the correction value Ka·ωm1s are input to the adder 601. The adder 601 outputs the sum of the angular velocity ωm1 and the correction value Ka·ωm1s to the subtracter 531 as the angular velocity feedback value ωfb. A subsequent operation is as described above.

As shown in FIG. 11, in addition to the position command Pc of the second driving source 402, the detection signals from the second position sensor 412 and the angular velocity sensor 32 are input to the second driving source control unit 202. The angular velocity ωA3m around the third rotating axis O3 of the third arm 14 from the third driving source control unit 203 is input to the second driving source control unit 202. The second driving source control unit 202 drives the second driving source 402 by feedback control using the respective detection signals such that the rotation angle (position feedback value Pfb) of the second driving source 402 calculated from the detection signal of the second position sensor 412 becomes the position command Pc and a below-described angular velocity feedback value ωfb becomes a below-described angular velocity command ωc.

That is, the position command Pc and a below-described position feedback value Pfb from the rotation angle calculation unit 552 are input to the subtracter 512 of the second driving source control unit 202. In the rotation angle calculation unit 552, the number of pulses input from the second position sensor 412 is counted, and the rotation angle of the second driving source 402 according to the count value is output to the subtracter 512 as the position feedback value Pfb. The subtracter 512 outputs the deviation (the value obtained by subtracting the position feedback value Pfb from a target value of the rotation angle of the second driving source 402) between the position command Pc and the position feedback value Pfb to the position control unit 522.

The position control unit 522 performs predetermined calculation processing using the deviation input from the subtracter 512, and a proportional gain or the like as a preset coefficient, and calculates the target value of the angular velocity of the second driving source 402 according to the deviation. The position control unit 522 outputs a signal representing the target value (command value) of the angular velocity of the second driving source 402 to the subtracter 532 as the angular velocity command ωc. Here, in this embodiment, although proportional control (P control) is performed as feedback control, the invention is not limited thereto.

The angular velocity command ωc and a below-described angular velocity feedback value ωfb are input to the subtracter 532. The subtracter 532 outputs the deviation (the value obtained by subtracting the angular velocity feedback value ωfb from the target value of the angular velocity of the second driving source 402) between the angular velocity command ωc and the angular velocity feedback value ωfb to the angular velocity control unit 542.

The angular velocity control unit 542 performs predetermined calculation processing including integration using the deviation input from the subtracter 532, and a proportional gain, an integral gain, and the like as preset coefficients, produces a driving signal (driving current) of the second driving source 402 according to the deviation, and supplies the driving signal to the motor 402M through the motor driver 302. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the second driving source 402 is controlled. Since the second rotating axis O2 is orthogonal to the first rotating axis O1, it is possible to control the actuation of the second driving source 402 separately from the first driving source 401 without being affected by operation or vibration of the first arm 12.

Next, the angular velocity feedback value ωfb in the second driving source control unit 202 will be described.

In the angular velocity calculation unit 562, an angular velocity ωm2 of the second driving source 402 is calculated on the basis of the frequency of a pulse signal input from the second position sensor 412, and the angular velocity ωm2 is output to the adder 602.

In the angular velocity calculation unit 562, an angular velocity ωA2m around the second rotating axis O2 of the second arm 13 is calculated on the basis of the frequency of the pulse signal input from the second position sensor 412, and the angular velocity ωA2m is output to the adder-subtracter 622. The angular velocity ωA2m is a value obtained by dividing the angular velocity ωm2 by a reduction ratio between the motor 402M of the second driving source 402 and the second arm 13, that is, in the joint 172.

In the angular velocity calculation unit 563 of the third driving source control unit 203, the angular velocity ωA3m around the third rotating axis O3 of the third arm 14 is calculated on the basis of the frequency of a pulse signal input from the third position sensor 413, and the angular velocity ωA3m is output to the adder-subtracter 622. The angular velocity ωA3m is a value obtained by dividing the angular velocity ωm3 by a reduction ratio between the motor 403M of the third driving source 403 and the third arm 14, that is, in the joint 173.

The angular velocity ω1 around the first detection axis, the angular velocity ω2 around the second detection axis, and the angular velocity ω3 around the third detection axis are detected by the angular velocity sensor 32, and the respective angular velocities ω1, ω2, and ω3 are input to the angular velocity conversion unit 611. In the angular velocity conversion unit 611, the angular velocity (the composite angular velocity of the second arm 13 and the third arm 14) ωA3 around the second rotating axis O2 of the third arm 14 is calculated from the input angular velocity ω1, and the angular velocity ωA3 is output to the adder-subtracter 622. Since the second rotating axis O2 and the third rotating axis O3 are orthogonal to the first rotating axis O1, it is possible to obtain the angular velocity around the second rotating axis O2 of the third arm 14 easily and reliably without being affected by operation or vibration of the first arm 12.

The angular velocity ωA3, the angular velocity ωA2m, and the angular velocity ωA3m are input to the adder-subtracter 622, and the adder-subtracter 622 outputs a value ωA2s (=ωA3−ωA2m−ωA3m) obtained by subtracting the angular velocity ωA2m and the angular velocity ωA3m from the angular velocity ωA3 to the conversion unit 582. The value ωA2s corresponds to the vibrational component (vibrational angular velocity) of the total angular velocity around the second rotating axis O2 of the second arm 13 and the third arm 14. Hereinafter, ωA2s is referred to as a vibrational angular velocity. In this embodiment, feedback control is performed to return a below-described gain Ka multiple of the vibrational angular velocity ωA2s (in detail, an angular velocity ωm2s in the motor 402M which is a value produced on the basis of the vibrational angular velocity ωA2s) to the input side of the second driving source 402. Specifically, the feedback control is performed on the second driving source 402 such that the vibrational angular velocity ωA2s becomes close to 0 as much as possible. Accordingly, it is possible to suppress vibration of the robot 1. In the feedback control, the angular velocity of the second driving source 402 is controlled.

The conversion unit 582 converts the vibrational angular velocity ωA2s to the angular velocity ωm2s in the second driving source 402, and outputs the angular velocity ωm2s to the correction value calculation unit 592. The conversion can be performed by multiplying the vibrational angular velocity ωA2s by a reduction ratio between the motor 402M of the second driving source 402 and the second arm 13, that is, in the joint 172.

The correction value calculation unit 592 multiplies the angular velocity ωm2s by the gain (feedback gain) Ka as a preset coefficient, obtains a correction value Ka·ωm2s, and outputs the correction value Ka·ωm2s to the adder 602. The gain Ka in the second driving source control unit 202 and the gain Ka in the first driving source control unit 201 may be the same or different from each other.

The angular velocity ωm2 and the correction value Ka·ωm2s are input to the adder 602. The adder 602 outputs the sum of the angular velocity ωm2 and the correction value Ka·ωm2s to the subtracter 532 as the angular velocity feedback value ωfb. A subsequent operation is as described above.

As shown in FIG. 11, in addition to the position command Pc of the third driving source 403, the detection signal from the third position sensor 413 is input to the third driving source control unit 203. The third driving source control unit 203 drives the third driving source 403 by feedback control using the respective detection signals such that the rotation angle (position feedback value Pfb) of the third driving source 403 calculated from the detection signal of the third position sensor 413 becomes the position command Pc and a below-described angular velocity feedback value ωfb becomes a below-described angular velocity command ωc.

That is, the position command Pc and a below-described position feedback value Pfb from the rotation angle calculation unit 553 are input to the subtracter 513 of the third driving source control unit 203. In the rotation angle calculation unit 553, the number of pulses input from the third position sensor 413 is counted, and the rotation angle of the third driving source 403 according to the count value is output to the subtracter 513 as the position feedback value Pfb. The subtracter 513 outputs the deviation (the value obtained by subtracting the position feedback value Pfb from a target value of the rotation angle of the third driving source 403) between the position command Pc and the position feedback value Pfb to the position control unit 523.

The position control unit 523 performs predetermined calculation processing using the deviation input from the subtracter 513, and a proportional gain or the like as a preset coefficient, and calculates a target value of the angular velocity of the third driving source 403 according to the deviation. The position control unit 523 outputs a signal representing the target value (command value) of the angular velocity of the third driving source 403 to the subtracter 533 as the angular velocity command ωc. Here, in this embodiment, although proportional control (P control) is performed as feedback control, the invention is not limited thereto.

In the angular velocity calculation unit 563, the angular velocity of the third driving source 403 is calculated on the basis of the frequency of a pulse signal input from the third position sensor 413, and the angular velocity is output to the subtracter 533 as the angular velocity feedback value ωfb.

The angular velocity command ωc and the angular velocity feedback value ωfb are input to the subtracter 533. The subtracter 533 outputs the deviation (the value obtained by subtracting the angular velocity feedback value ωfb from the target value of the angular velocity of the third driving source 403) between the angular velocity command ωc and the angular velocity feedback value ωfb to the angular velocity control unit 543.

The angular velocity control unit 543 performs predetermined calculation processing including integration using the deviation input from the subtracter 533, and a proportional gain, an integral gain, and the like as preset coefficients, produces a driving signal (driving current) of the third driving source 403 according to the deviation, and supplies the driving signal to the motor 403M through the motor driver 303. Here, in this embodiment, although PI control is performed as feedback control, the invention is not limited thereto.

In this way, the feedback control is performed such that the position feedback value Pfb becomes equal to the position command Pc as much as possible and the angular velocity feedback value ωfb becomes equal to the angular velocity command ωc as much as possible, and the driving current of the third driving source 403 is controlled.

The driving source control units 204 to 206 are the same as the third driving source control unit 203, and thus, description thereof will not be repeated.

As described above, in the robot 1 and the robot system 10, the angular velocity of the first arm 12 can be detected by the angular velocity sensor 32, and since the third rotating axis O3 is parallel to the second rotating axis O2, the angular velocity of the third arm 14 including the rotation amount of the second arm 13 can be detected by the angular velocity sensor 32. Then, it is possible to suppress vibration on the basis of these detection results.

Even if the posture of the robot 1 changes, the first detection axis of the angular velocity sensor 32 is constant. That is, a state where the first detection axis matches or is parallel to the second rotating axis O2 is maintained without being affected by the posture of the robot 1. For this reason, it is not necessary to correct the angular velocity of the third arm 14 detected by the angular velocity sensor 32 with the direction of the angular velocity sensor 32. If the posture of the robot 1 changes, the second detection axis and the third detection axis rotate around the first detection axis while the detection axes are maintained at a right angle. That is, the posture (slope) of each of the second and third detection axes with respect to the first rotating axis O1 changes depending on the posture of the robot 1. However, the angular velocity ω2 around the second detection axis and the angular velocity ω3 around the third detection axis are combined, whereby it is possible to simply obtain the angular velocity of the first arm 12, and it is not necessary to perform correction by the direction of the angular velocity sensor 32 (or even if correction is required, a comparatively simple correction may be performed). Accordingly, complicated and enormous computation is not required. Therefore, a computation error is less likely to occur, and it is possible to reliably suppress vibration and to increase a response speed in the control of the robot 1.

Since the angular velocity of the third arm 14 including the rotation amount of the second arm 13 is detected by the angular velocity sensor 32 instead of the angular velocity of the second arm 13, it is possible to suppress vibration more reliably. Since the angular velocity of the first arm 12 and the angular velocity of the third arm 14 including the rotation amount of the second arm 13 are detected by one angular velocity sensor 32, it is possible to reduce the number of angular velocity sensors, to reduce cost, and to simplify the configuration compared to a case where the same angular velocity sensor is provided in each of the first arm and the second arm.

The actuation of the second driving source 402 which rotates the second arm 13 located on the base end side from the third arm 14 is controlled, whereby it is possible to increase the effect of suppressing vibration of the robot 1.

Since the third arm 14 is located on the front end side from the first and second arms 12 and 13, and is connected to the base 11 through a large number of members, the third arm 14 is likely to decrease in rigidity compared to the first and second arms 12 and 13. Unnecessary vibration of the first and second arms 12 and 13 is transmitted to the third arm 14. For this reason, unnecessary vibration is likely to be generated in the third arm 14 compared to the first and second arms 12 and 13. Accordingly, the angular velocity sensor 32 is provided in the third arm 14, making it possible to effectively suppress vibration of the third arm.

Although the robot, the robot control device, and the robot system of the invention have been described on the basis of the illustrated embodiment, the invention is not limited to the embodiment, and the configuration of each unit can be substituted with an arbitrary configuration having the same function. Other arbitrary constituent components may be added to the invention.

As the motor of each driving source, in addition to the servomotor, for example, a stepping motor or the like may be used. If a stepping motor is used as the motor, as a position sensor, for example, a position sensor which measures the number of driving pulses input to the stepping motor so as to detect the rotation angle of the motor may be used.

In the foregoing embodiment, although a configuration in which the three-axis angular velocity sensor including the first detection axis, the second detection axis, and the third detection axis orthogonal to each other is used as the inertial sensor has been described, the inertial sensor is not particularly limited insofar as the angular velocity around the first rotating axis of the first arm and the angular velocity of the third arm including the rotation amount of the second arm can be detected. As the inertial sensor, for example, an acceleration sensor which can detect the acceleration in the direction of the first detection axis, the acceleration in the direction of the second detection axis, and the acceleration in the direction of the third detection axis may be used. With the use under the condition in which acceleration can be approximated to angular velocity, the same performance as an angular velocity sensor can be exhibited. As the inertial sensor, a combination of an acceleration sensor and an angular velocity sensor may be used.

The type of each position sensor or each angular velocity sensor is not particularly limited, and for example, an optical type, a magnetic type, an electromagnetic type, an electrical type, or the like may be used.

In the foregoing embodiment, although the actuation of the second driving source rotating the second arm is controlled on the basis of the detection result of the angular velocity sensor, the invention is not limited thereto, and for example, the actuation of the third driving source rotating the third arm may be controlled on the basis of the detection result of the angular velocity sensor.

In the foregoing embodiment, although the number of rotating axes of the robot is six, the invention is not limited thereto, and the number of rotating axes of the robot may be three, four, five, or seven or more.

That is, in the foregoing embodiment, although, since the wrist has two arms, the number of arms of the robot is six, the invention is not limited thereto, and the number of arms of the robot may be three, four, five, or seven or more.

In the foregoing embodiment, although the robot is a single-arm robot which has an arm connector with a plurality of arms rotatably connected together, the invention is not limited thereto, and for example, the robot may be a robot having a plurality of arm connectors, for example, a double-arm robot which has two arm connectors with a plurality of arms rotatably connected together, or the like.

The entire disclosure of Japanese Patent Application No. 2013-082273 filed Apr. 10, 2013 is expressly incorporated by reference herein.

What is claimed is:

1. A robot comprising:
   a base;
   a first arm rotatably connected to the base around a first rotating axis;
   a second arm rotatably connected to the first arm around a second rotating axis;
   a third arm rotatably connected to the second arm around a third rotating axis;
   a fourth arm rotatably connected to the third arm around a fourth rotating axis;
   a three-axis inertial sensor provided in the third arm, the three-axis inertial sensor including a first detection axis, a second detection axis, and a third detection axis; and
   an inertial sensor unit having a housing, the housing accommodating the three-axis inertial sensor and a circuit unit therein, the circuit unit AD converting and transmitting a signal output from the three-axis inertial sensor;
   wherein the inertial sensor unit is provided in the third arm;
   the housing is a rectangular parallelepiped;
   the first detection axis of the three-axis inertial sensor is aligned with a normal to a largest surface of the rectangular parallelepiped; and
   wherein the rectangular parallelepiped includes:
       a first pair of opposite surfaces connected to the largest surface; and
       a second pair of opposite surfaces connected to the largest surface;
   the second detection axis of the three-axis inertial sensor is aligned with a normal to the first pair of opposite surfaces; and
   the third detection axis of the three-axis inertial sensor is aligned with a normal to the second pair of opposite surfaces.

2. The robot according to claim 1,
   wherein the three-axis inertial sensor is a three-axis angular velocity sensor which detects a first angular velocity around the first detection axis, a second angular velocity around the second detection axis, and a third angular velocity around the third detection axis.

3. The robot according to claim 1,
   wherein the housing has an attachment portion attached to the third arm, the attachment portion being in a corner portion of the housing.

4. The robot according to claim 3, further comprising:
   a conductive fixing member fixing the attachment portion to the third arm and grounding the circuit unit to the third arm.

5. The robot according to claim 1,
   wherein the third arm has a housing and an arm-side attachment portion formed integrally with the housing, and
   the inertial sensor unit is directly attached to the arm-side attachment portion.

6. The robot according to claim 1, further comprising:
   a power cable provided in the third arm and adapted to supply power to the robot,
   wherein the three-axis inertial sensor is arranged in an end portion of the third arm on an opposite side to the cable.

7. The robot according to claim 1, further comprising:
   a fifth arm rotatably connected to the fourth arm rotatably around a fifth rotating axis, the fifth rotating axis being orthogonal to the fourth rotating axis; and
   a sixth arm rotatably connected to the fifth arm rotatably around a sixth rotating axis, the sixth rotating axis being orthogonal to the fifth rotating axis.

8. The robot according to claim 1,
   wherein the first rotating axis is aligned with a normal of an installation surface of the base.

9. The robot according to claim 1, wherein:
   the second rotating axis is orthogonal to the first rotating axis,
   the third rotating axis is parallel to the second rotating axis,
   the fourth rotating axis is orthogonal to the third rotating axis,
   the first, second, and third detection axes are orthogonal to each other, and
   the first detection axis is parallel to the third rotating axis.

* * * * *